(12) United States Patent
Choi

(10) Patent No.: US 12,054,212 B2
(45) Date of Patent: Aug. 6, 2024

(54) FRONT CHASSIS SYSTEM OF TILTING VEHICLE

(71) Applicant: HJ MOTO CO., LTD., Ansan-si (KR)

(72) Inventor: Hyeong Jin Choi, Ansan-si (KR)

(73) Assignee: HJ MOTO CO., LTD., Ansan-si (KR)

( * ) Notice: Subject to any disclaimer, the term of this patent is extended or adjusted under 35 U.S.C. 154(b) by 0 days.

(21) Appl. No.: 18/066,092

(22) Filed: Dec. 14, 2022

(65) Prior Publication Data

US 2023/0115767 A1  Apr. 13, 2023

Related U.S. Application Data

(63) Continuation of application No. PCT/KR2021/003293, filed on Mar. 17, 2021.

(30) Foreign Application Priority Data

Jun. 15, 2020 (KR) ........................ 10-2020-0072264

(51) Int. Cl.
*B62D 3/02* (2006.01)
*B62D 9/02* (2006.01)
(Continued)

(52) U.S. Cl.
CPC ................ *B62D 9/02* (2013.01); *B62D 3/02* (2013.01); *B62K 5/08* (2013.01); *B62K 5/10* (2013.01);
(Continued)

(58) Field of Classification Search
CPC .... B60G 15/062; B60G 21/005; B60G 21/05; B60G 2204/129; B60G 2204/414;
(Continued)

(56) References Cited

U.S. PATENT DOCUMENTS

2016/0137251 A1* 5/2016 Mercier ............... B60G 13/005
180/210

FOREIGN PATENT DOCUMENTS

CN 102358121 A * 2/2012 ............... B60G 3/26
JP 2005088742 A * 4/2005 .............. B62J 27/00
(Continued)

OTHER PUBLICATIONS

Description Translation for KR 2006/0035869 from Espacenet (Year: 2006).*

(Continued)

*Primary Examiner* — Jason D Shanske
*Assistant Examiner* — Daniel M. Keck
(74) *Attorney, Agent, or Firm* — Studebaker & Brackett PC

(57) ABSTRACT

The present disclosure relates to a front chassis system of a tilting vehicle, and a front chassis system of a tilting vehicle. The system includes at least: a front swing arm-left connected to and provided at a vehicle body and a front steering wheel-left, and a front swing arm-right connected to and provided at the vehicle body and a front steering wheel-right; a front shock absorber-left connected to and provided at the front swing arm-left, and a front shock absorber-right connected to and provided at the front swing arm-right; a front tilt bar rotatably connected to and provided at the vehicle body, and connected to and provided at the front shock absorber-left and the front shock absorber-right; at least one front elastic roller provided at the vehicle body; and a steering device linked to and provided at a steering wheel part assembled on the vehicle body.

14 Claims, 29 Drawing Sheets

(51) Int. Cl.
  *B62D 61/06* (2006.01)
  *B62K 5/08* (2006.01)
  *B62K 5/10* (2013.01)
  *B62K 5/027* (2013.01)
  *B62K 5/05* (2013.01)

(52) U.S. Cl.
  CPC ............ *B62D 61/065* (2013.01); *B62K 5/027* (2013.01); *B62K 5/05* (2013.01)

(58) Field of Classification Search
  CPC .......... B60G 2204/416; B60G 2204/82; B60G 2204/8302; B60G 2206/11; B60G 2300/122; B60G 2300/45; B62D 3/02; B62D 9/02; B62D 61/065; B62K 5/027; B62K 5/05; B62K 5/06; B62K 5/08; B62K 5/10; B62K 25/04; B62K 2005/001
  See application file for complete search history.

(56) References Cited

FOREIGN PATENT DOCUMENTS

| | | | |
|---|---|---|---|
| KR | 10-2006-0035869 A | 4/2006 | |
| KR | 10-2017-0119238 A | 10/2017 | |
| KR | 10-2002577 B1 | 7/2019 | |
| KR | 10-2019-0092813 A | 8/2019 | |
| KR | 10-2186803 B1 | 12/2020 | |
| WO | WO-2009059099 A2 * | 5/2009 | ............ B60G 11/16 |
| WO | WO-2022208875 A1 * | 10/2022 | |

OTHER PUBLICATIONS

Description Translation for KR 2019/0092813 from Espacenet (Year: 2019).*
International Search Report issued in PCT/KR2021/003293; mailed Jun. 24, 2021.

* cited by examiner

FRONT CHASSIS SYSTEM OF TILTING VEHICLE

CROSS-REFERENCE TO RELATED APPLICATIONS

The present application is a continuation of International Patent Application No. PCT/KR2021/003293, filed on Mar. 17, 2021, which is based upon and claims the benefit of priority to Korean Patent Application No. 10-2020-0072264, filed on Jun. 15, 2020. The disclosures of the above-listed applications are hereby incorporated by reference herein in their entirety.

TECHNICAL FIELD

The present invention relates to a front chassis system of a tilting vehicle, and more particularly, to a front chassis system of a tilting vehicle, in which steering of a two-wheeled vehicle, such as body steering, counter steering, or pivot steering, can be performed at corners by a front swing arm-left hand (left) and a front swing arm-right hand (right) that separate a front steering wheel-left from a front steering wheel-right through an inclination of the vehicle, the front swing arm-left and the front swing arm-right are fastened to a front tilt bar, a front tilt bar-left, or a front tilt bar-right assembled with a vehicle body together with a front elastic roller through each shock absorber or each tilting rod, and even when the vehicle is switched from a high-speed linear operation or medium-speed linear operation to a low-speed linear operation, the center of gravity of the vehicle is maintained by the front elastic roller, and thus driving stability of the vehicle can be improved, the vehicle can be stopped or parked by the front elastic roller without a fixing device, and particularly, the vehicle is restored to the center of gravity without falling over when the vehicle is lightly shaken or pushed.

BACKGROUND ART

Examples of vehicles in which vehicle bodies are tilted (tilting: moving and leaning vehicle bodies while the vehicles travels at high speed) include three-wheeled tilting vehicles, general two-wheeled vehicles, and three-or-more wheeled vehicles. The three-wheeled tilting vehicle is provided with an electric electronic device that controls a vehicle body to be tilted by separating a left wheel from a right wheel. Due to various electric/electronic/control devices, manufacturing cost increases, durability of the electronic device is degraded, and driving stability decreases due to errors of control of the electronic devices, and maintainability decreases. Thus, the technology is limitedly applied to some vehicles.

The two-wheeled vehicle has excellent driving stability when a vehicle drives in a curved section due to a structure thereof but has a great risk that the vehicle falls to left and right sides in a case in which the vehicle travels frequently at low speed on a complex and crowded road such as a city center. In particular, in order to stop or park the vehicle, there is a hassle to stop or park the vehicle using (operating) a fixing device.

In order to reduce the hassle phenomenon of the vehicle, the vehicle is equipped with an electronic rotating body gyro device so that the vehicle is prevented from falling over when the vehicle travels at low speed. However, the gyro device is expensive and much electrical energy is consumed for operating the gyro sensor, and accordingly, manufacturing cost increase, durability of electronic devices decreases, driving stability due to errors in electronic devices, and maintainability decreases. Thus, this technology is limitedly applied to some vehicles.

In the three-or-more wheeled vehicle, corner driving is controlled using a functional operation of a leaning multi-wheel (LMW) or an actuator or a function of a parallelogram suspension, a hydraulic tilting system, or dynamic vehicle control (DVC), or the like. Thus, the three-or-more tilting vehicle has the better driving stability than the two-wheeled vehicle, but a risk when the vehicle travels at low speed as in the two-wheeled vehicle and a hassle to stop or park the vehicle greatly occur.

In order to reduce these phenomena of the three-or-more wheeled vehicle, the vehicle is equipped with a manual or electronic tilt locking device for stopping or parking. However, the tilt locking device still has a hassle phenomenon in which the tilt locking device should be operated whenever the vehicle is stopped or parked and still has a hassle problem when the vehicle travels at low speed.

DISCLOSURE

Technical Problem

The present invention is directed to providing a front chassis system of a tilting vehicle, which is mounted on a vehicle and tilts a vehicle body by an inclination of the vehicle so that a two-wheeled vehicle can be steered at corners, the vehicle is balanced with respect to the center of gravity even when the vehicle is switched from high-speed straight driving or middle-speed straight driving to low-speed straight driving, driving stability and driving performance of the vehicle can be improved, and the vehicle can also be stopped or parked without a fixing device, and thus convenience of the driver can be improved.

Technical Solution

One aspect of the present invention provides a front chassis system of a tilting vehicle including a front swing arm-left and a front swing arm-right assemble in a vehicle body and a front steering wheel-left and a front steering wheel-right, a front shock absorber-left and a front shock absorber-right connection-installed in the front swing arm-left and the front swing arm-right, a front tilt bar connection-installed in the vehicle body and connection-installed in the front shock absorber-left and the front shock absorber-right, at least one front elastic roller installed in the vehicle body to control a rotational operation of the front tilt bar, and a steering device that is linked with a steering handle part and is connection-installed in the front steering wheel-left and the front steering wheel-right.

Another aspect of the present invention provides a front chassis system of a tilting vehicle including a front swing arm-left and a front swing arm-right assembled in a vehicle body and a front steering wheel-left and a front steering wheel-right, a front tilting rod-left and a front tilting rod-right connection-installed in the front swing arm-left and the front swing arm-right, a front tilt bar-left connection-installed in the vehicle body and connection-installed in the front tilting rod-left, a front tilt bar-right connection-installed in the vehicle and connection-installed in the front tilting rod-right, a front shock absorber connection-installed in the front tilt bar-left and the front tilt bar-right, at least one a front elastic roller installed in the vehicle body to control a rotational operation of the left tilt bar or the right tilt bar, and a steering device connection-installed in a steering handle part and connection-installed in the front steering wheel-left and the front steering wheel-right.

When a driver performs a steering operation involving tilting while a vehicle is turning in a curved section, the front steering wheel-left and the front steering wheel-right connection-installed in the front swing arm-left and the front swing arm-right may be spaced apart from each other so that the vehicle body is inclined, and the front tilt bar connection-installed in a front shock absorber-left and a front shock absorber-right may rotate about a front tilt bar pin according to movement of the front swing arm-left and the front swing arm-right or the front tilt bar-left.

The front tilt bar-left and the front tilt bar-right connection-installed in the front tilting rod-left and the front tilting rod-right may rotate about a front tilt bar pin according to the movement of the front swing arm-left and the front swing arm-right, the vehicle may receive elastic force resistance of the front elastic roller from start of a tilting operation of the vehicle up to a set range due to shape matching or shape fitting with the front elastic roller assembled in the front tilt part or the front tilt bar-left or the front tilt bar-right, but when the vehicle is out of the set range, an elastic force may be removed so that the vehicle is tilted in a steering operation direction.

When the vehicle leads to low-speed straight driving or is stopped from driving in a state in which the vehicle is balanced in the left-right direction, the front tilt bar or the front tilt bar-left or the front tilt bar-right may receive resistance of rotation about the front tilt bar pin due to shape matching or shape fitting with the front elastic roller, the front steering wheel-left and the front steering wheel-right may be suppressed from being spaced apart from each other, and thus the vehicle may be suppressed from falling to left and right sides.

When the vehicle is parked in a state in which the vehicle is balanced in the left-right direction, the front tilt bar or the front tilt bar-left or the front tilt bar-right may receive resistance of rotation about the front tilt bar pin due to shape matching or shape fitting with the front elastic roller, the front steering wheel-left and the front steering wheel-right may be suppressed from being spaced apart from each other, and thus the vehicle may be suppressed from falling to left and right sides.

Advantageous Effects

According to the present invention, in a front chassis system of a tilting vehicle, a vehicle body is tilted in a steering direction by a steering operation involving tilting by a driver at corners, and thus a leaning phenomenon of a vehicle or a risk of overturning of the vehicle body are prevented. According to the present invention, since a front tilt bar or a front tilt bar-left or a front tilt bar-right rotates according to the steering operation by the driver at cornering and sharp turns of the vehicle, the vehicle may perform the tilting, that is, lean driving, in the steering direction, thereby greatly reducing the risk of leaning and overturning of the vehicle.

According to the present invention, since an elastic force of the front elastic roller controls rotation of the front tilt bar or the front tilt bar-left or the front tilt bar-right, that is, the tilting of the vehicle during low-speed straight driving, the vehicle is driven while the center of gravity thereof is maintained, thus the risk of falling of the vehicle at low speed can be greatly reduced, and accordingly, driving safety can be increased.

According to the present invention, when the vehicle is stopped or parked, since the elastic force of the front elastic roller controls a rotational force of the front tilt bar or the front tilt bar-left or the front tilt bar-right, that is, the tilting of the vehicle body, the vehicle is stably stopped or parked without the fixing device, and thus a hassle for the driver to operate the fixing device can be greatly reduced.

According to the present invention, the front chassis system includes mechanical and material components, and thus, as compared to a vehicle including electric/electronic/control components, manufacturing cost is low, durability is high, there is no driving accident due to an error in control of the electric device, and maintainability is high. Thus, the present invention can be generally applied.

The present invention can be applied not only to an electric vehicle using a driving force of a motor but also to an engine vehicle or a bicycle by manpower, and the vehicle includes all types of transportation apparatuses having three or more wheels.

MODES OF THE INVENTION

Figure 1:
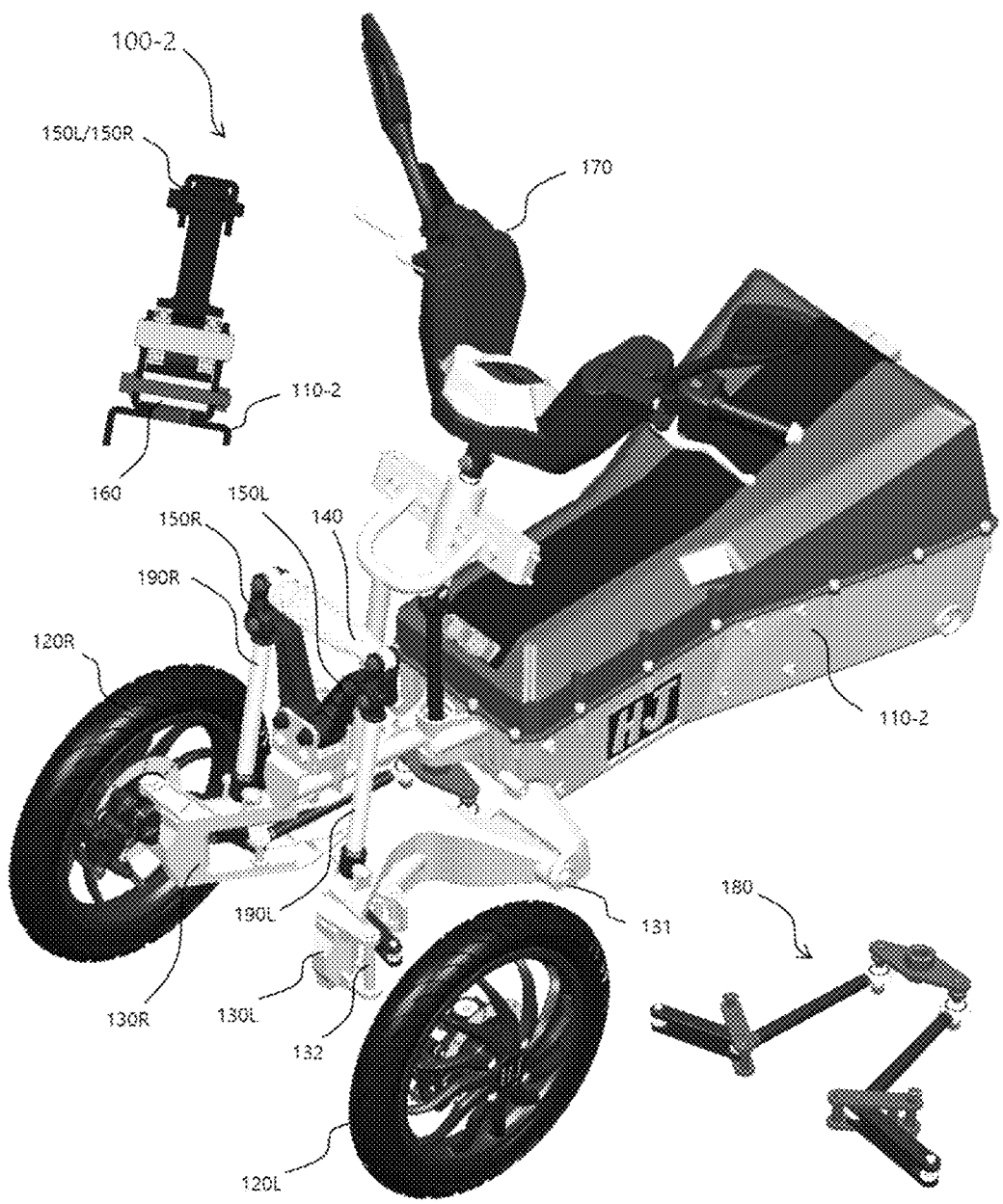
FIG. 1 is an exemplary schematic view illustrating a front chassis system of a tilting vehicle according to the present invention.

Hereinafter, detailed embodiments for implementing the present invention will be described with reference to the accompanying drawings. The embodiments of the present invention are intended to describe one invention and the scope of right is not limited to the illustrated embodiments. For clarity of the invention, only the essential contents will be enlarged and illustrated, and the ancillary contents will be omitted. Thus, interpretation should not be limited to the drawings. Suffixes "module" and "part" for components used in the following description are given and interchangeably used in consideration of only the ease of writing the specification, and do not have distinct meanings or roles by themselves. In the present specification, the same and similar reference components are designated by the same and similar reference numerals, and a description thereof will be replaced by the first description. Singular expressions used herein include plural expressions unless clearly otherwise indicated in the context.

Figure 2:
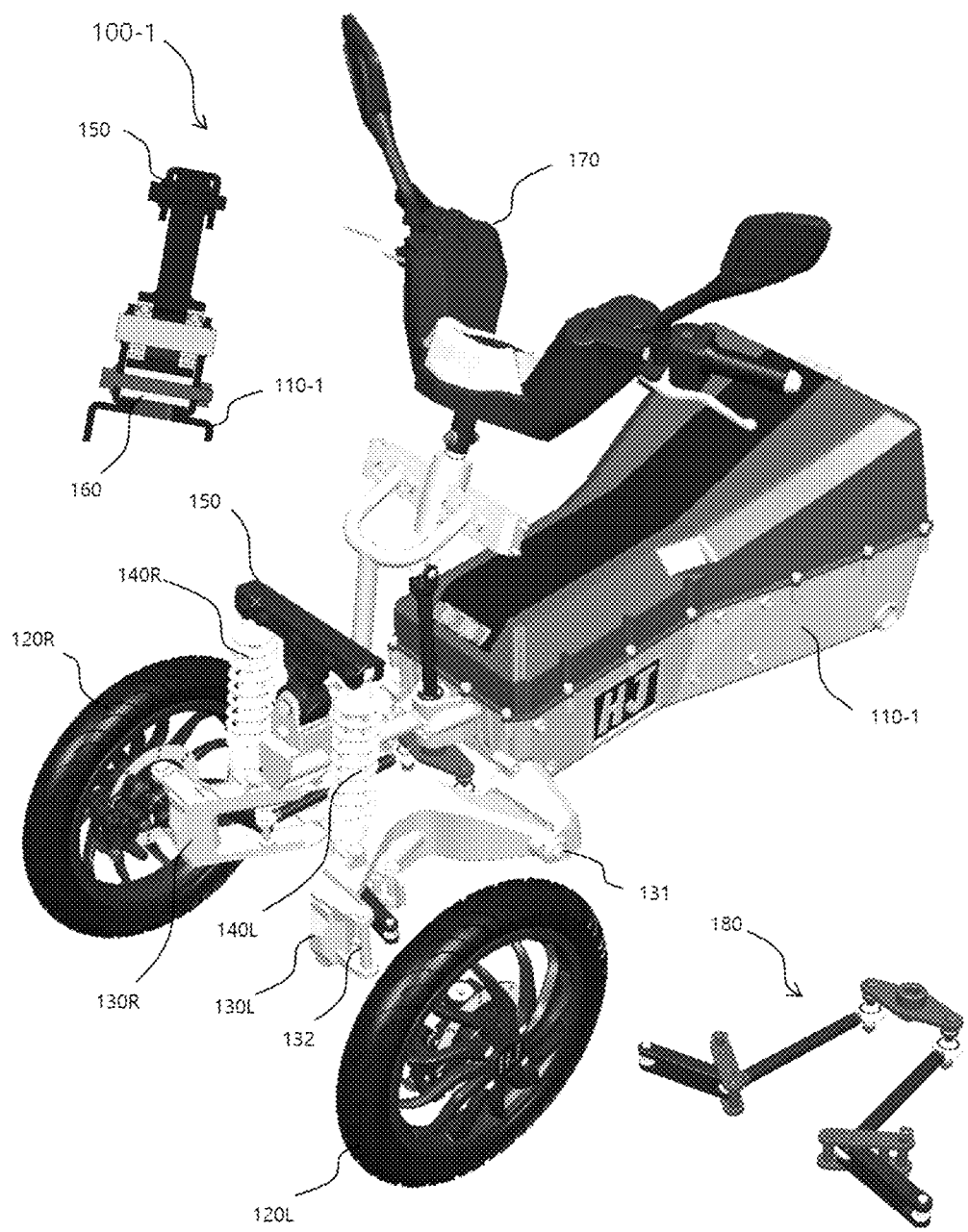
FIG. 2 is another exemplary schematic view illustrating the front chassis system of a tilting vehicle according to the present invention.
Figure 3:
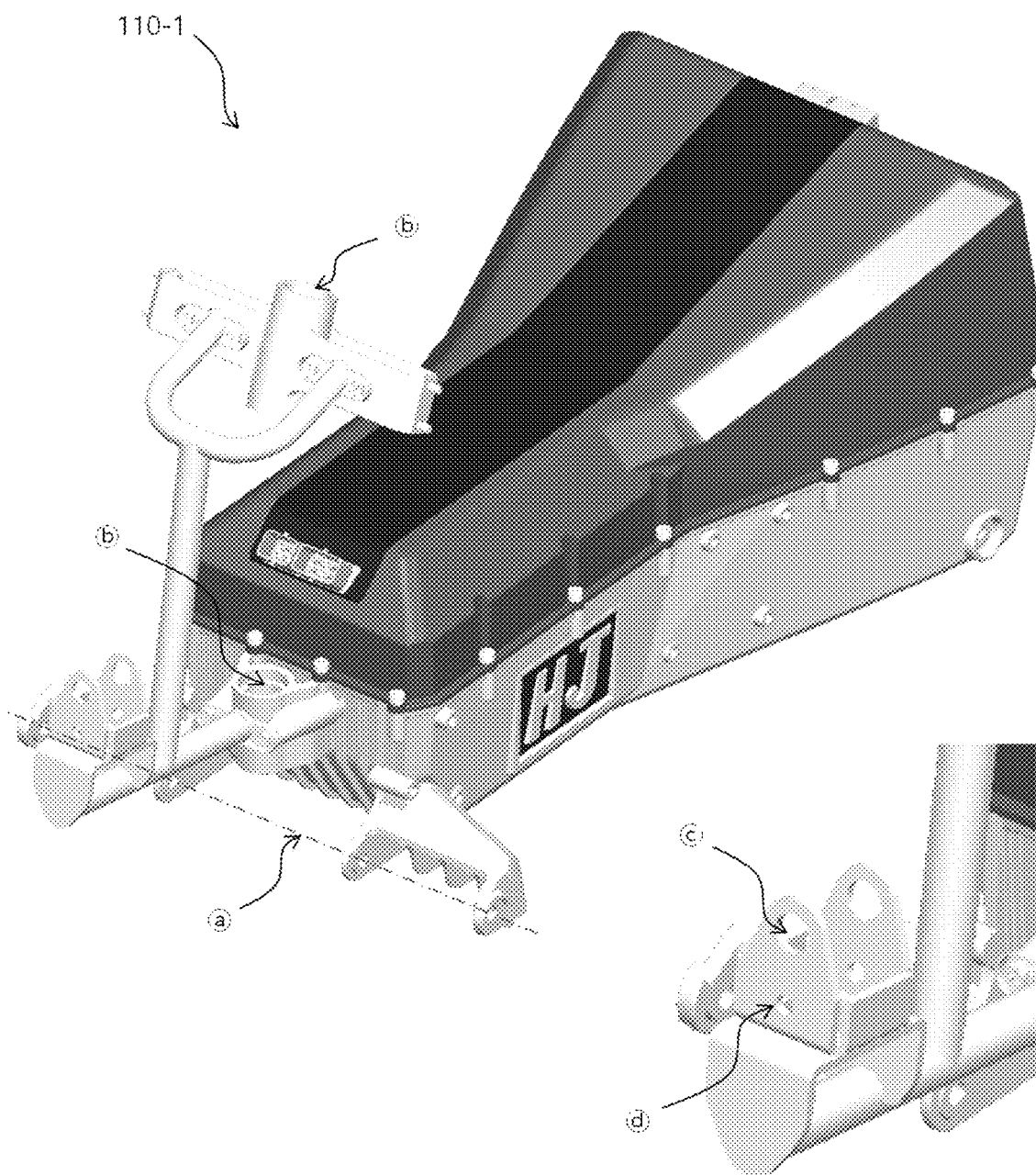
FIG. 3 is an exemplary schematic view illustrating a vehicle body of the front chassis system of a tilting vehicle according to the present invention.
Figure 4:
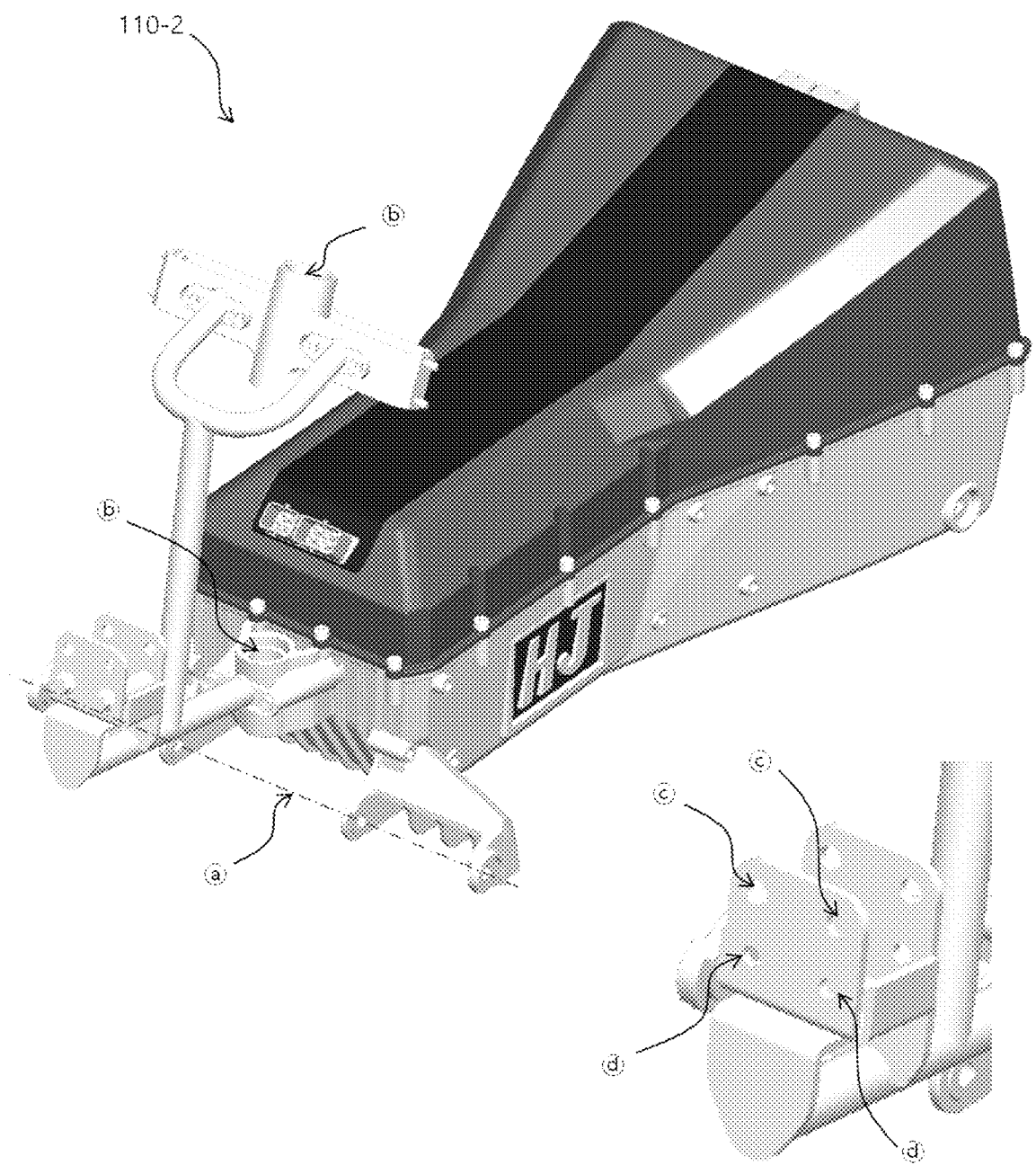
FIG. 4 is another exemplary schematic view illustrating the vehicle body of the front chassis system of a tilting vehicle according to the present invention.
Figure 5:
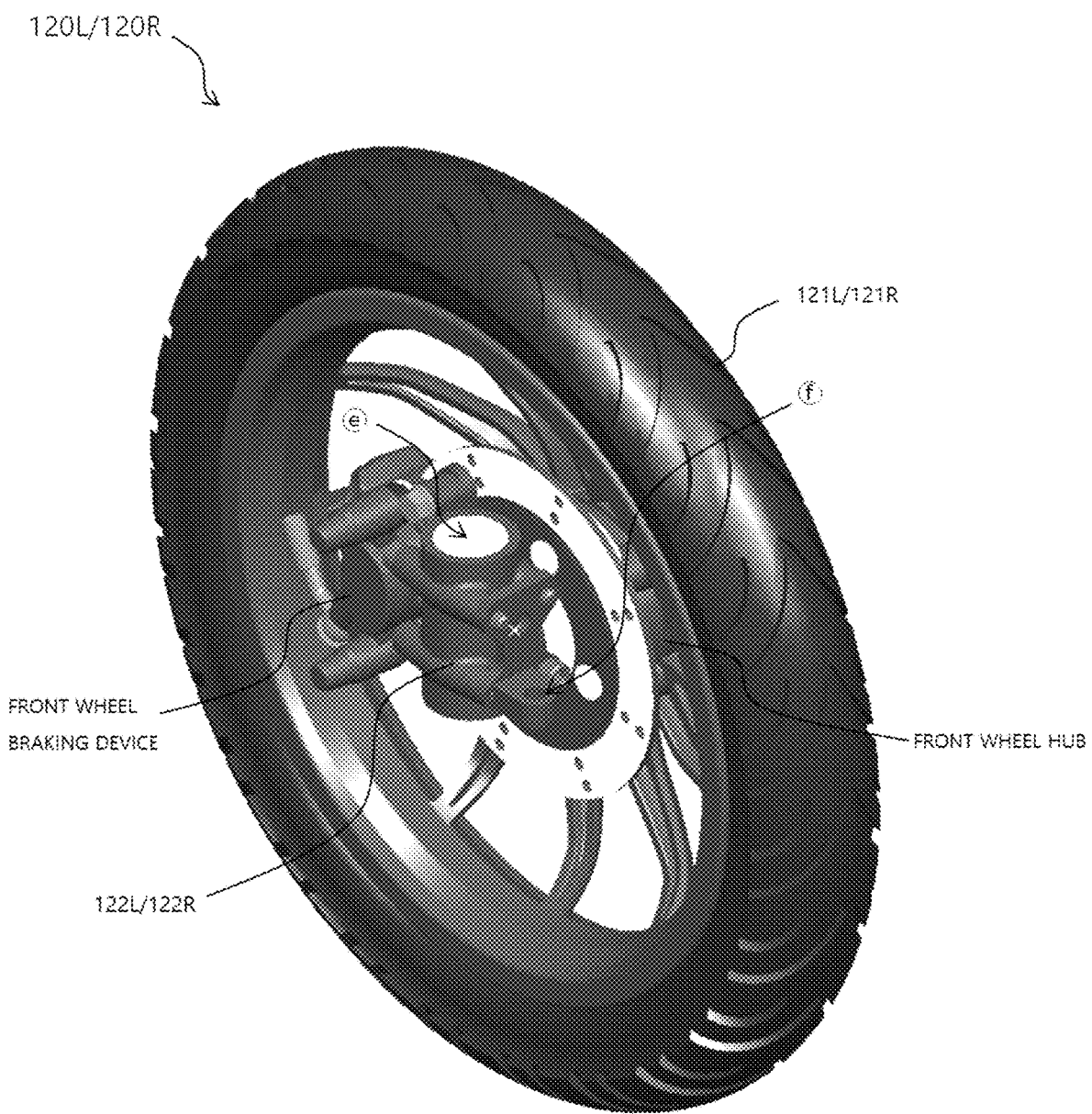
FIG. 5 is an exemplary view illustrating a front steering wheel-left and a front steering wheel-right of the front chassis system of a tilting vehicle according to the present invention.
Figure 6:
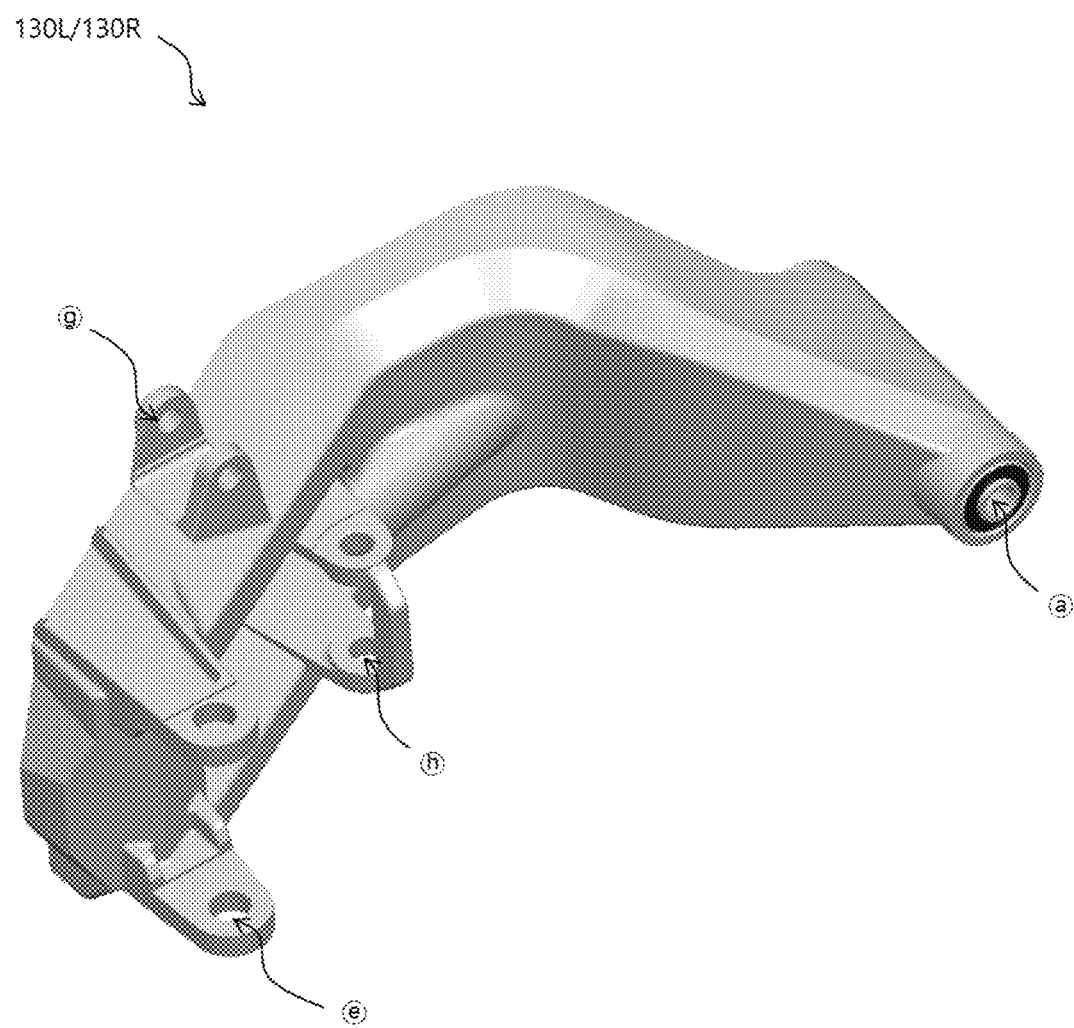
FIG. 6 is an exemplary view illustrating a structure of a front swing arm-left or front swing arm-right of the front chassis system of a tilting vehicle according to the present invention.
Figure 7:
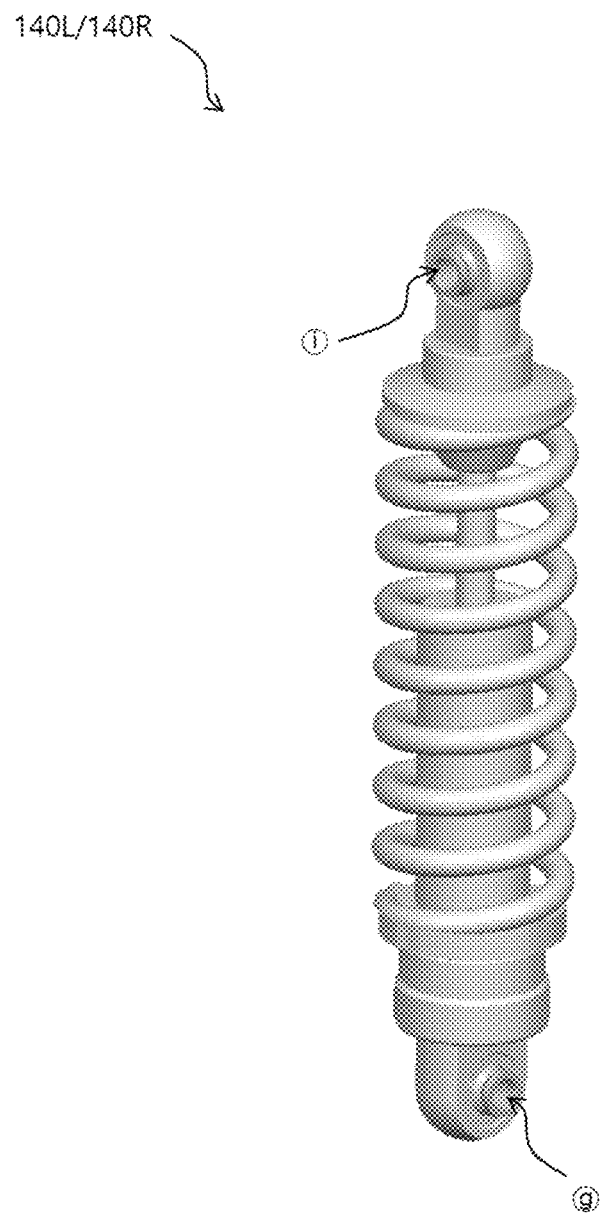
FIG. 7 is an exemplary view illustrating a front shock absorber-left or front shock absorber-right of the front chassis system of a tilting vehicle according to the present invention.
Figure 8:
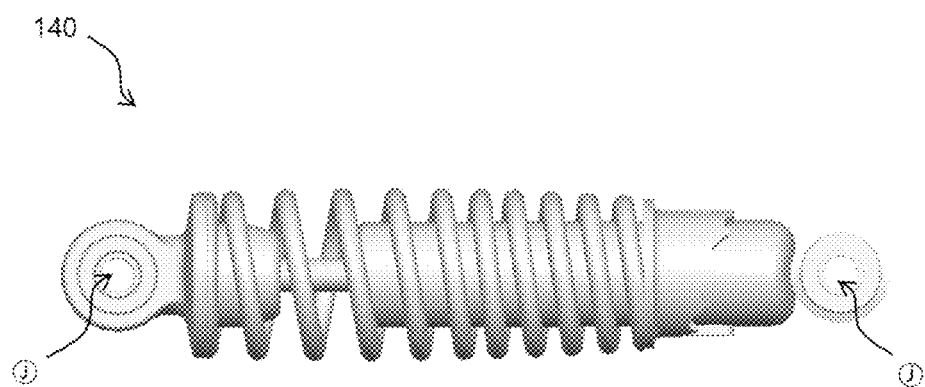
FIG. 8 is an exemplary schematic view illustrating a structure of a front shock absorber of the front chassis system of a tilting vehicle according to the present invention.
Figure 9:
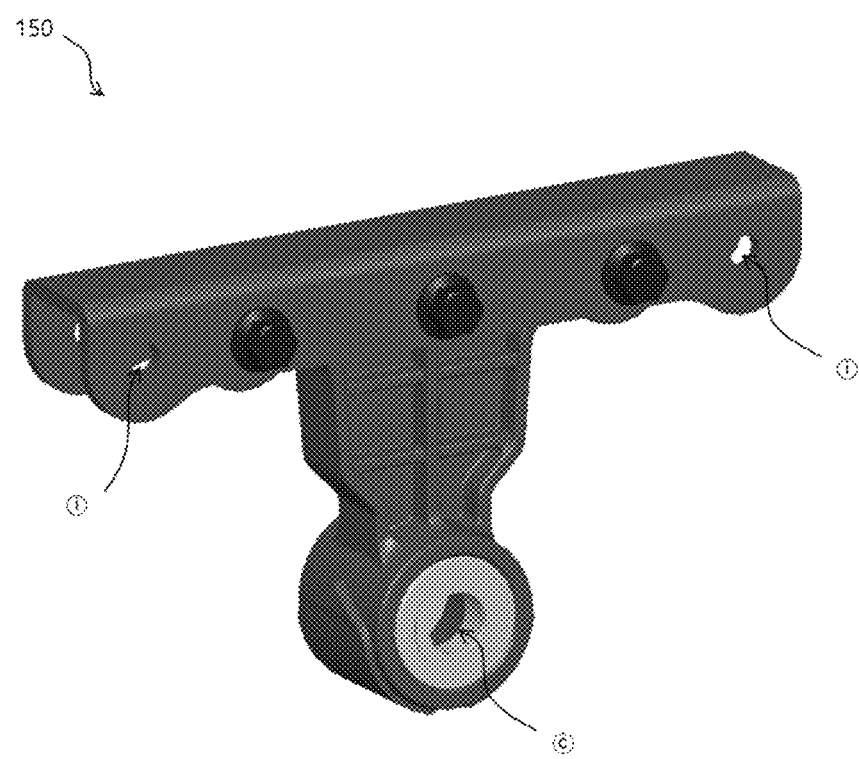
FIG. 9 is an exemplary view illustrating a shape of a front tilt bar of the front chassis system of a tilting vehicle according to the present invention.
Figure 10:
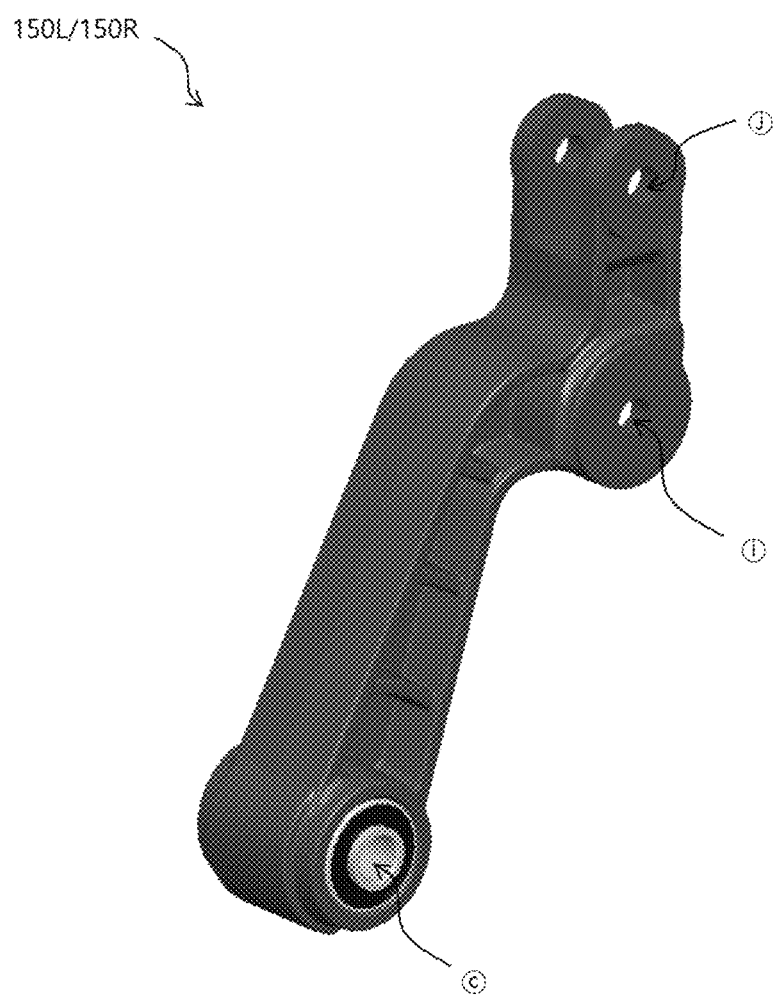
FIG. 10 is an exemplary view illustrating a shape of a front tilt bar-left or front tilt bar-right of the front chassis system of a tilting vehicle according to the present invention.
Figure 11:
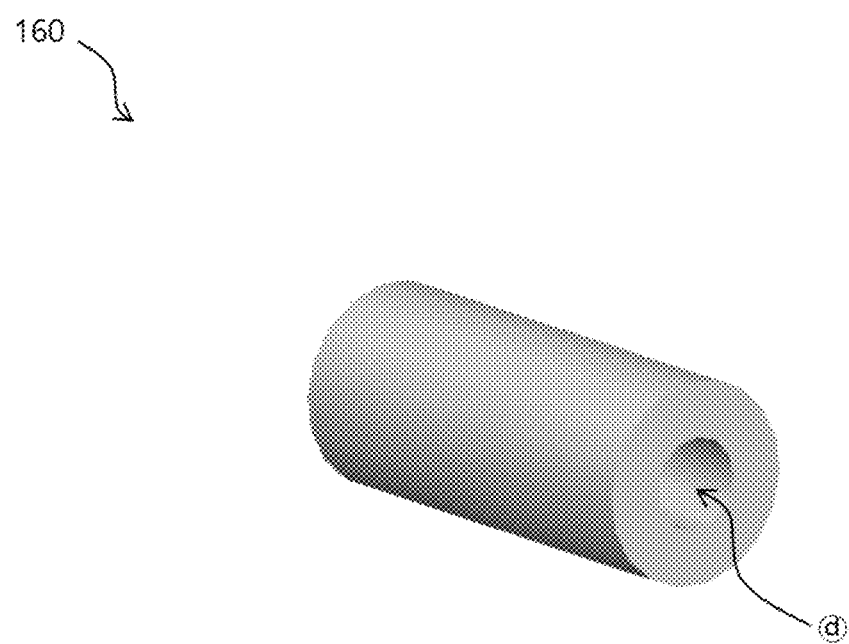
FIG. 11 is an exemplary view illustrating a shape of a front elastic roller of the front chassis system of a tilting vehicle according to the present invention.
Figure 12:
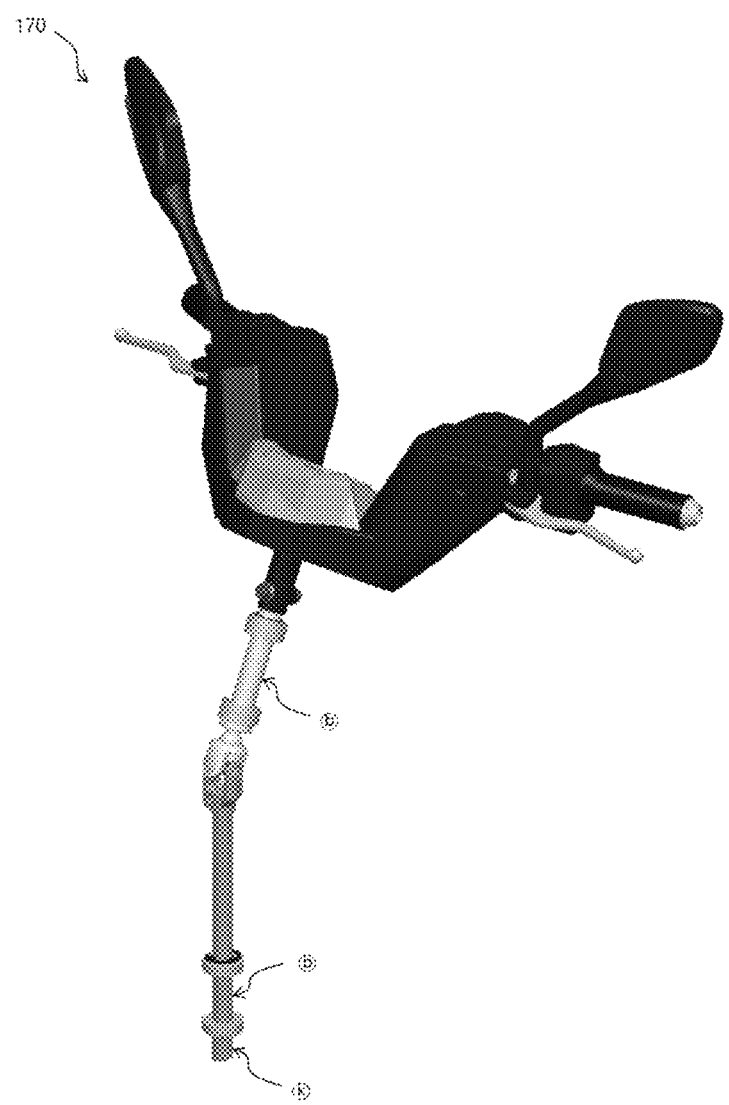
FIG. 12 is an exemplary view illustrating a structure of a steering handle part of the front chassis system of a tilting vehicle according to the present invention.
Figure 13:
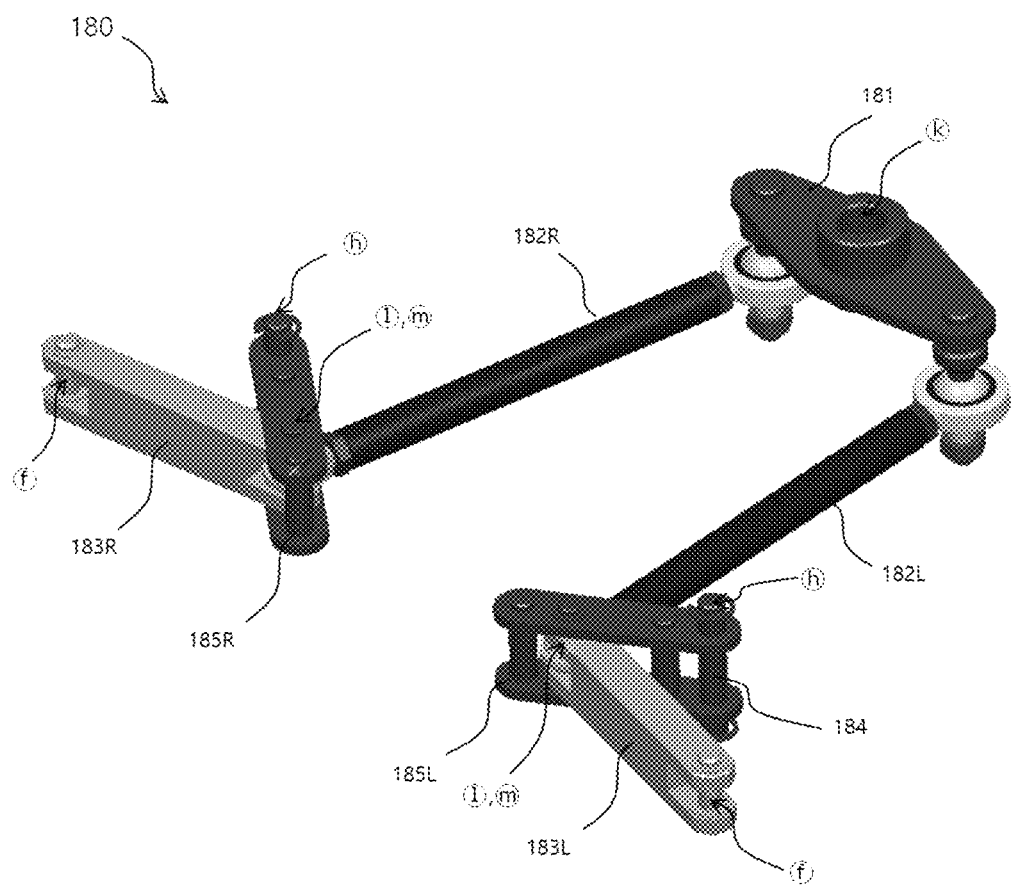
FIG. 13 is an exemplary view illustrating a steering device of the front chassis system of a tilting vehicle according to the present invention.
Figure 14:
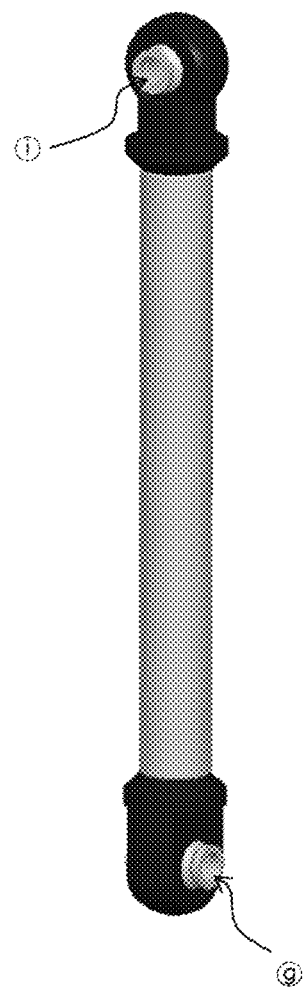
FIG. 14 is an exemplary view illustrating a front tilting rod-left or front tilting rod-right of the front chassis system of a tilting vehicle according to the present invention.
Figure 15:
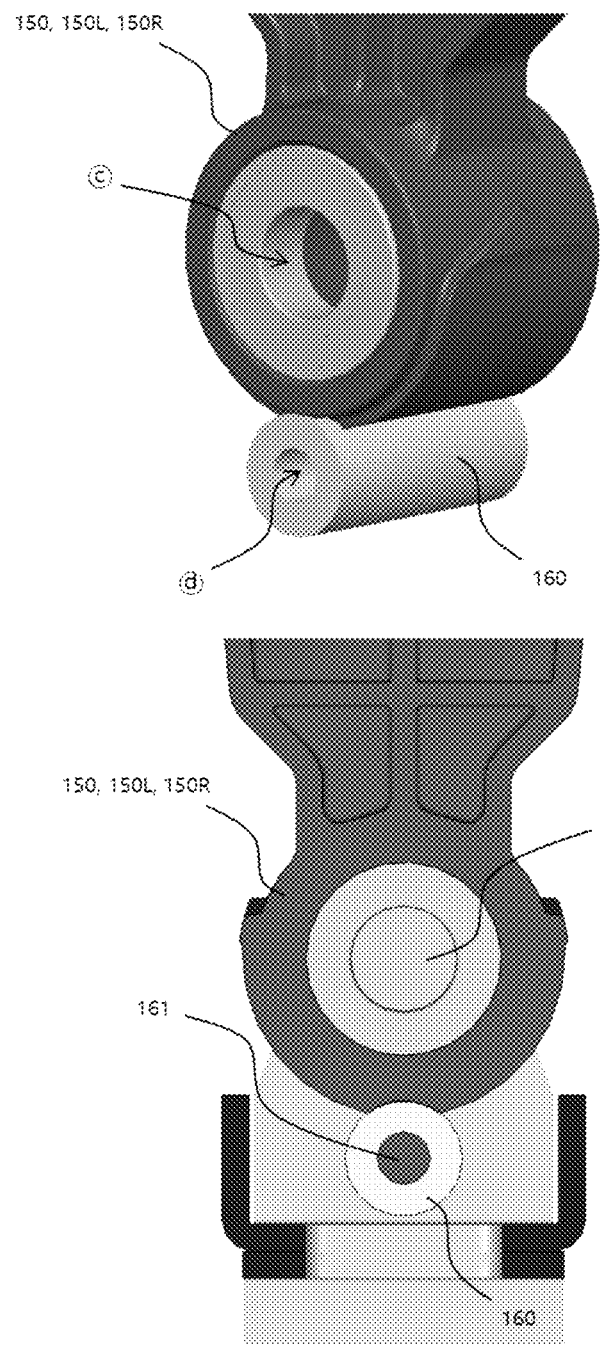
FIG. 15 is an exemplary view illustrating a state in which the front elastic roller is assembled with the front tilt bar or the front tilt bar-left or the front tilt bar-right of the front chassis system of a tilting vehicle according to the present invention.
Figure 16:
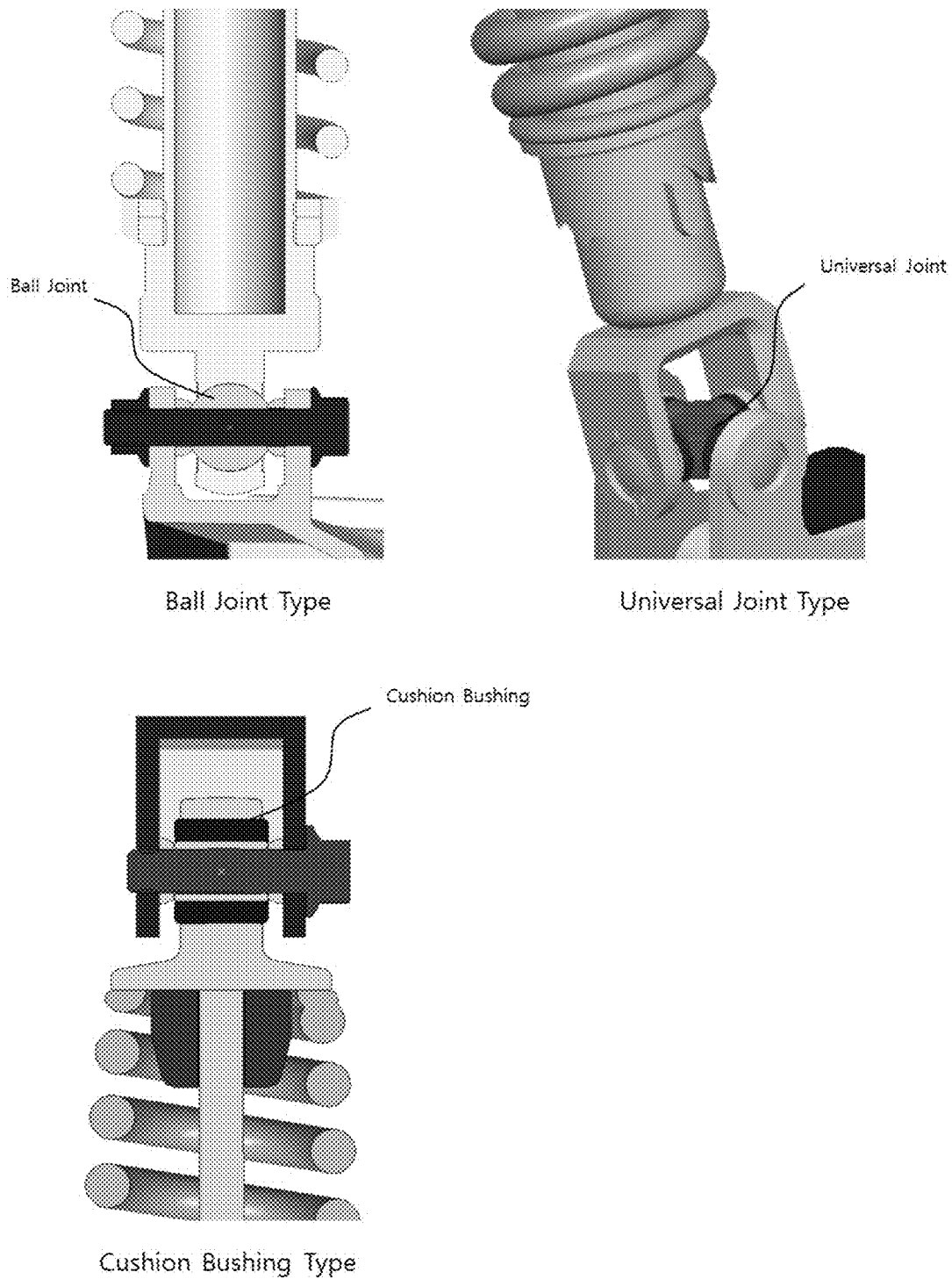
FIG. 16 is an exemplary view illustrating a fastening method of the front shock absorber-left, the front shock absorber-right, the front shock absorber, the front tilting rod-left, or the front tilting rod-right of the front chassis system of a tilting device according to the present invention.
Figure 17:
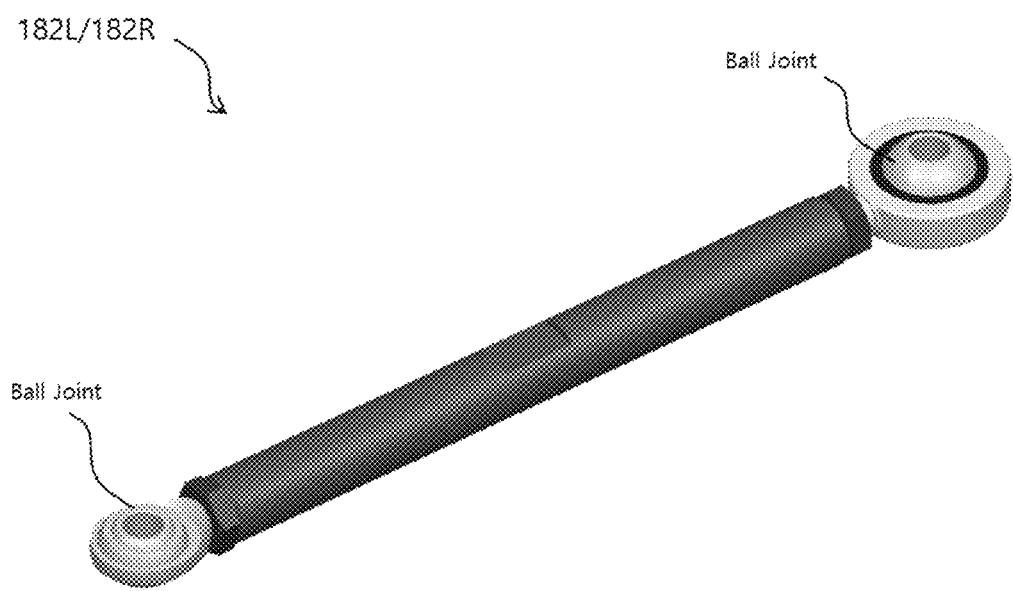
FIG. 17 is an exemplary view illustrating a structure of a left steering rod or right steering rod of the front chassis system of a tilting vehicle according to the present invention.
Figure 18:
FIG. 18 is an exemplary view illustrating an exterior of a front side of a vehicle equipped with the front chassis system of a tilting vehicle according to the present invention.
Figure 19:
FIG. 19 is an exemplary view illustrating an exterior of the front side of the vehicle equipped with the front chassis system of a tilting vehicle according to the present invention in a state in which the vehicle is tilted.
Figure 20:
FIG. 20 is an exemplary view illustrating the exterior of the front side of the vehicle equipped with the front chassis system of a tilting vehicle according to the present invention.
Figure 21:
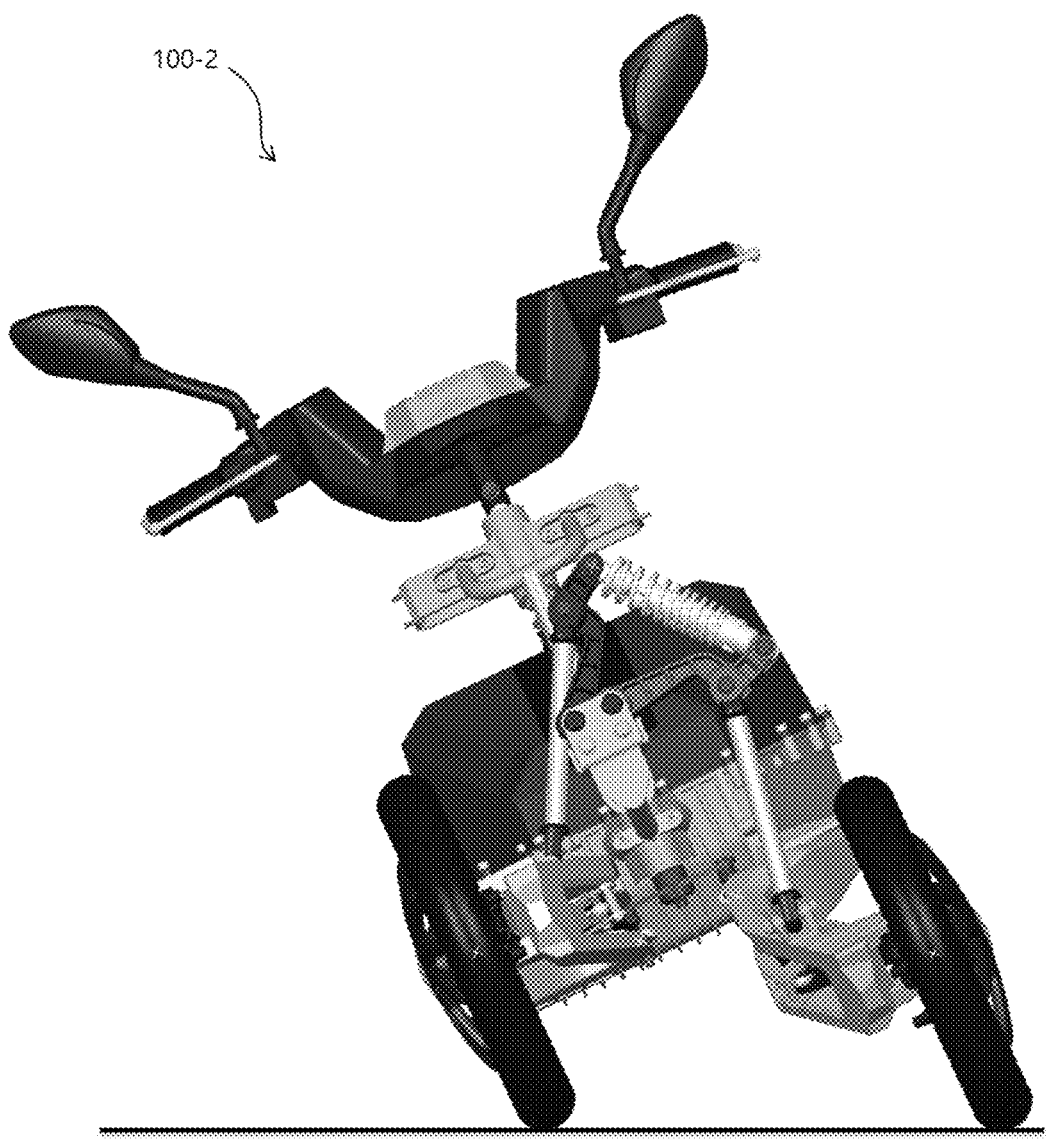
FIG. 21 is an exemplary view illustrating the exterior of the front side of the vehicle equipped with the front chassis system of a tilting vehicle according to the present invention in a state in which the vehicle is tilted.
Figure 22:
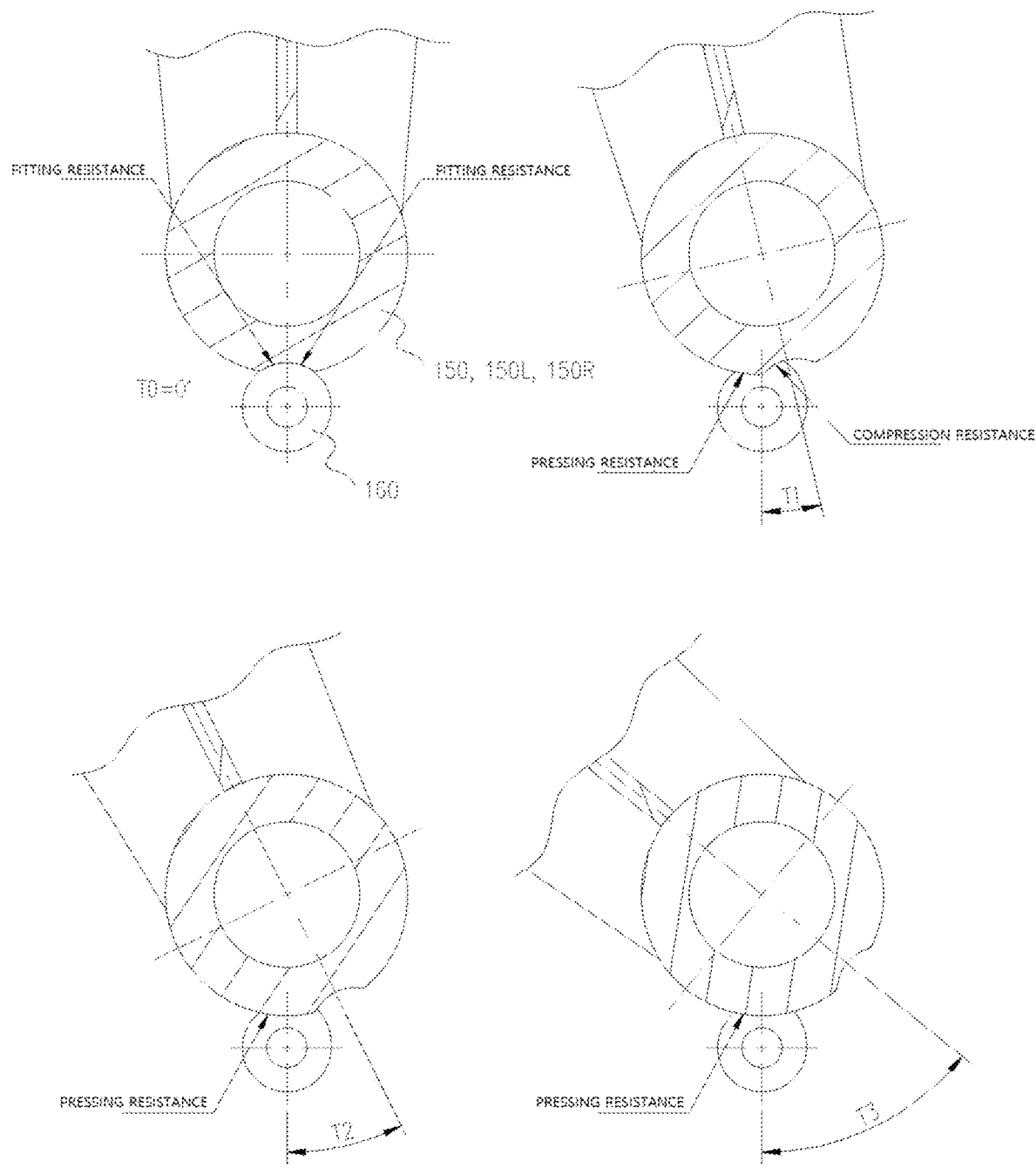
FIG. 22 is an exemplary view illustrating a shape of the front elastic roller according to rotation of the front tilt bar, the front tilt bar-left, or the front tilt bar-right of the front chassis system of a tilting vehicle according to the present invention.
Figure 23:
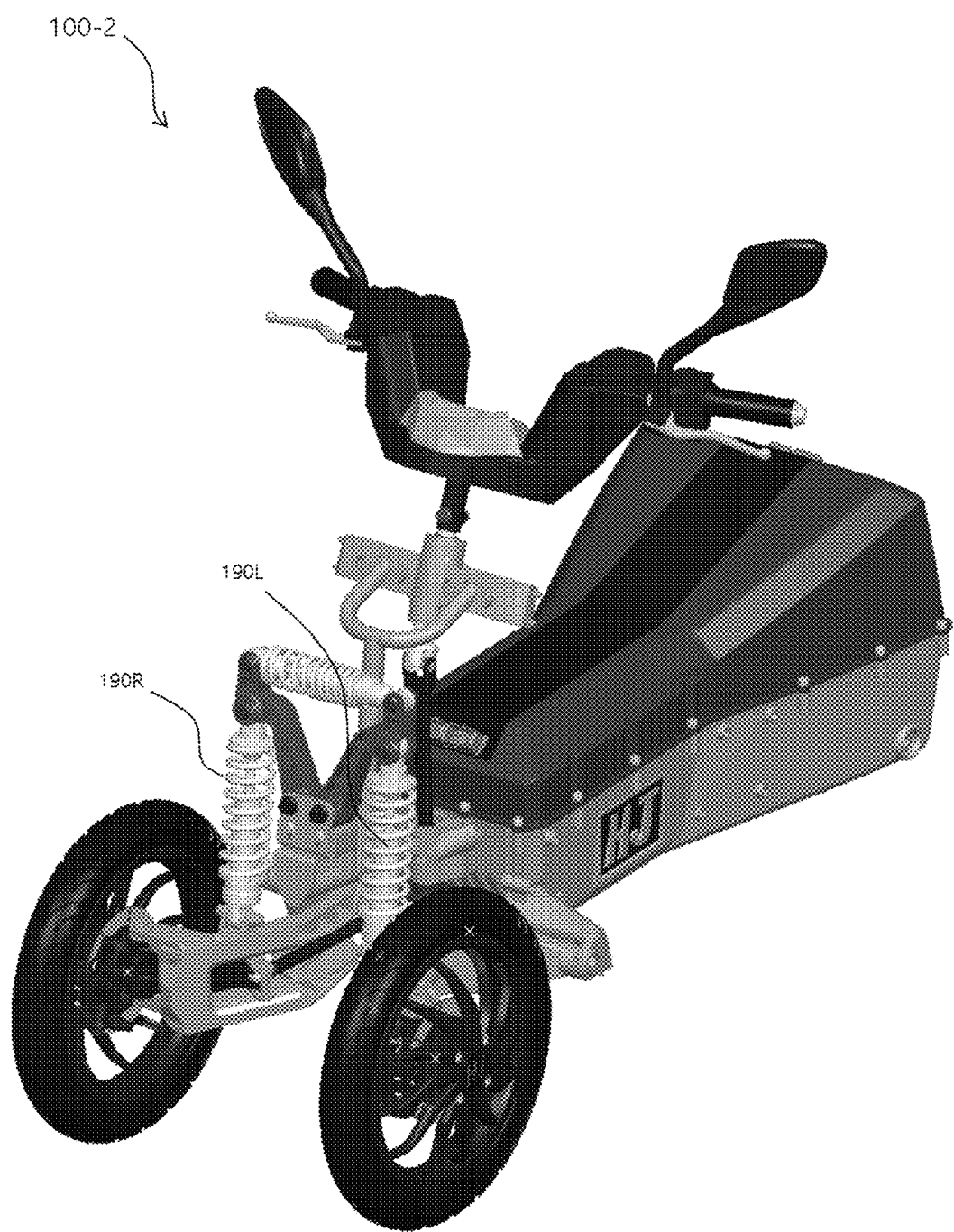
FIG. 23 is another exemplary schematic view illustrating the front chassis system of a tilting vehicle according to the present invention.
Figure 24:
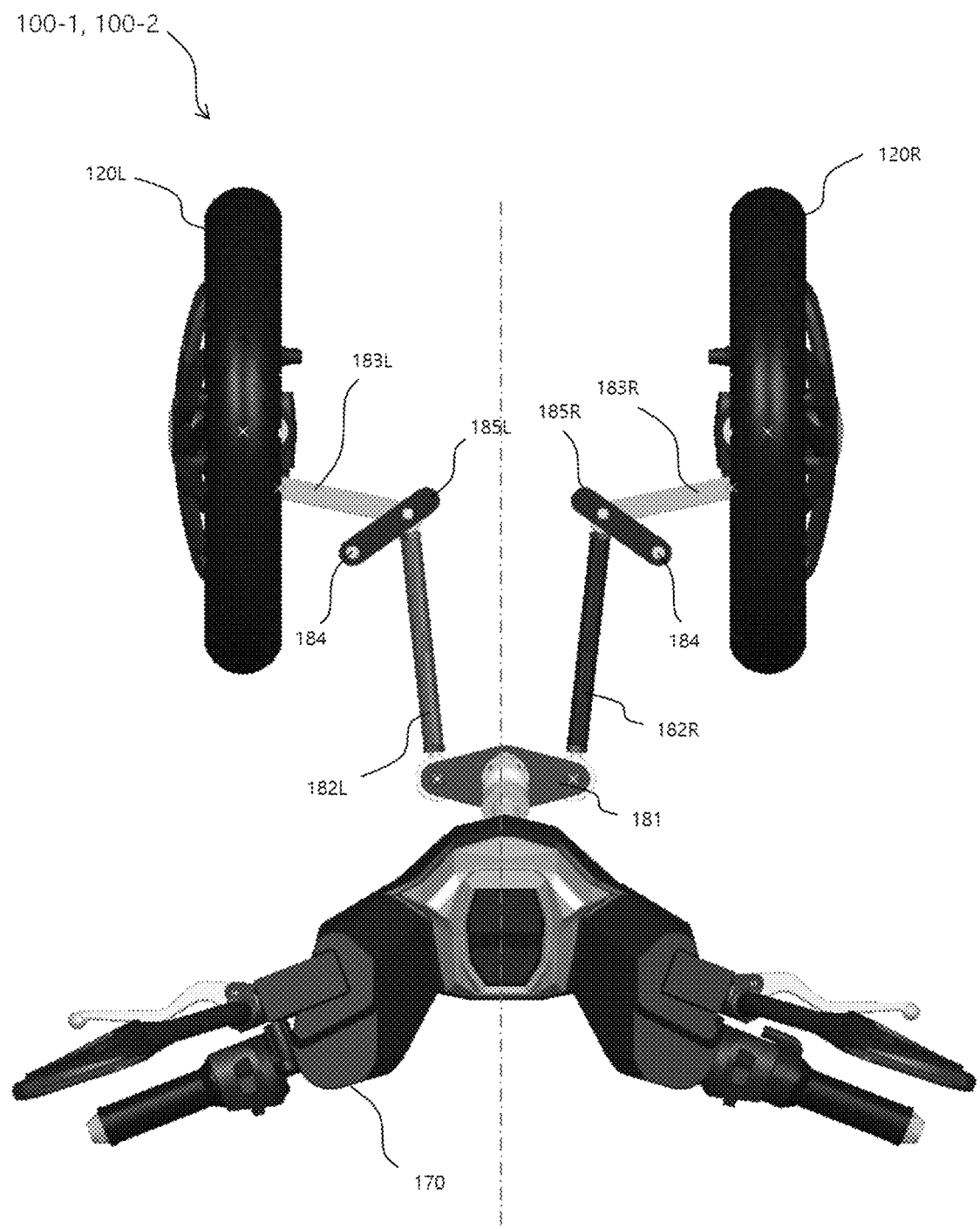
FIG. 24 is an exemplary view illustrating a planar structure in a straight driving form in which the steering handle part, the steering device, and the front steering wheel-left and the front steering wheel-right of the front chassis system of a tilting vehicle according to the present invention are assembled.
Figure 25:
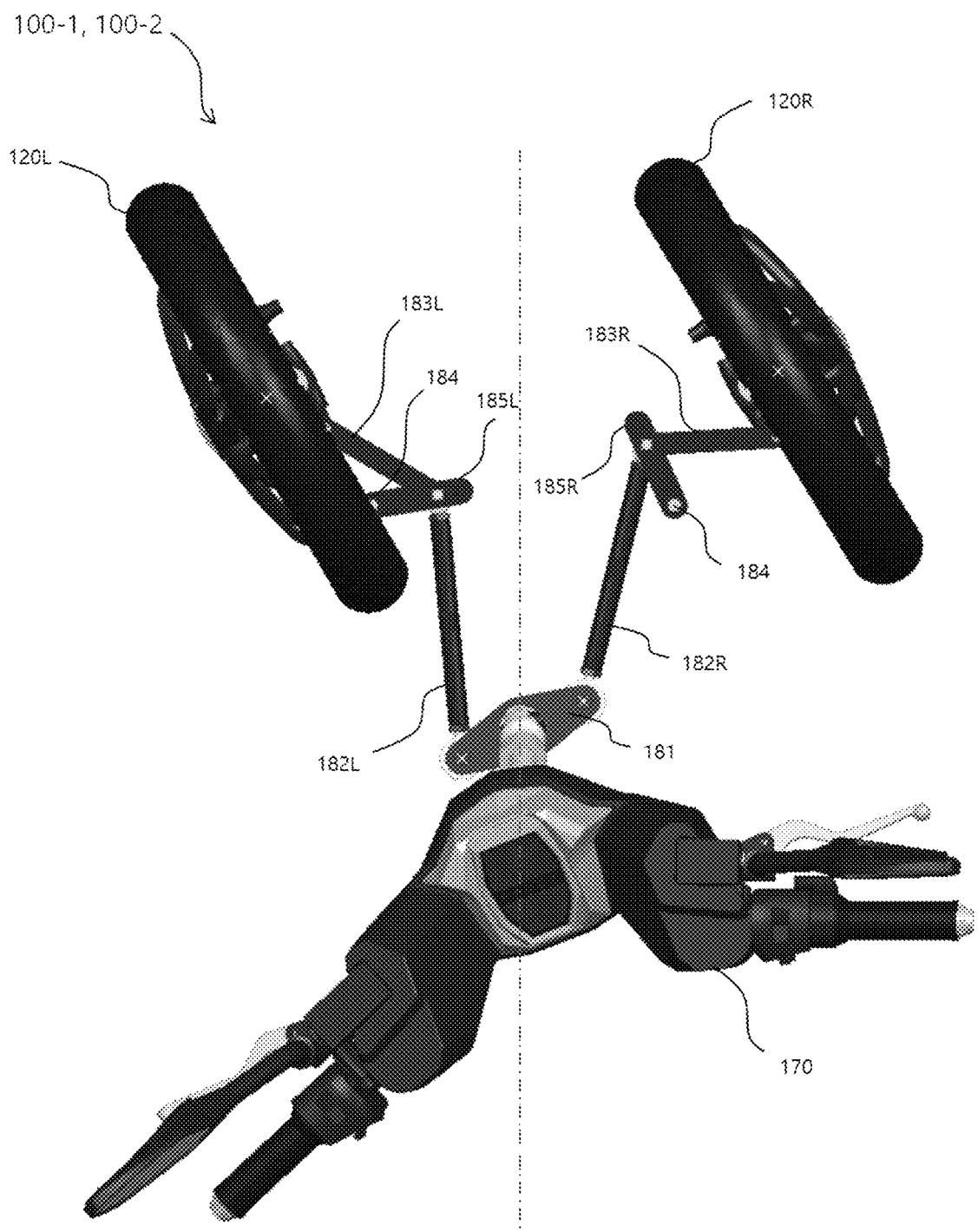
FIG. 25 is an exemplary view illustrating a planar structure in the form of left turning, in which the steering handle part, the steering device, and the front steering wheel-left and the front steering wheel-right of the front chassis system of a tilting vehicle according to the present invention are assembled.
Figure 26:
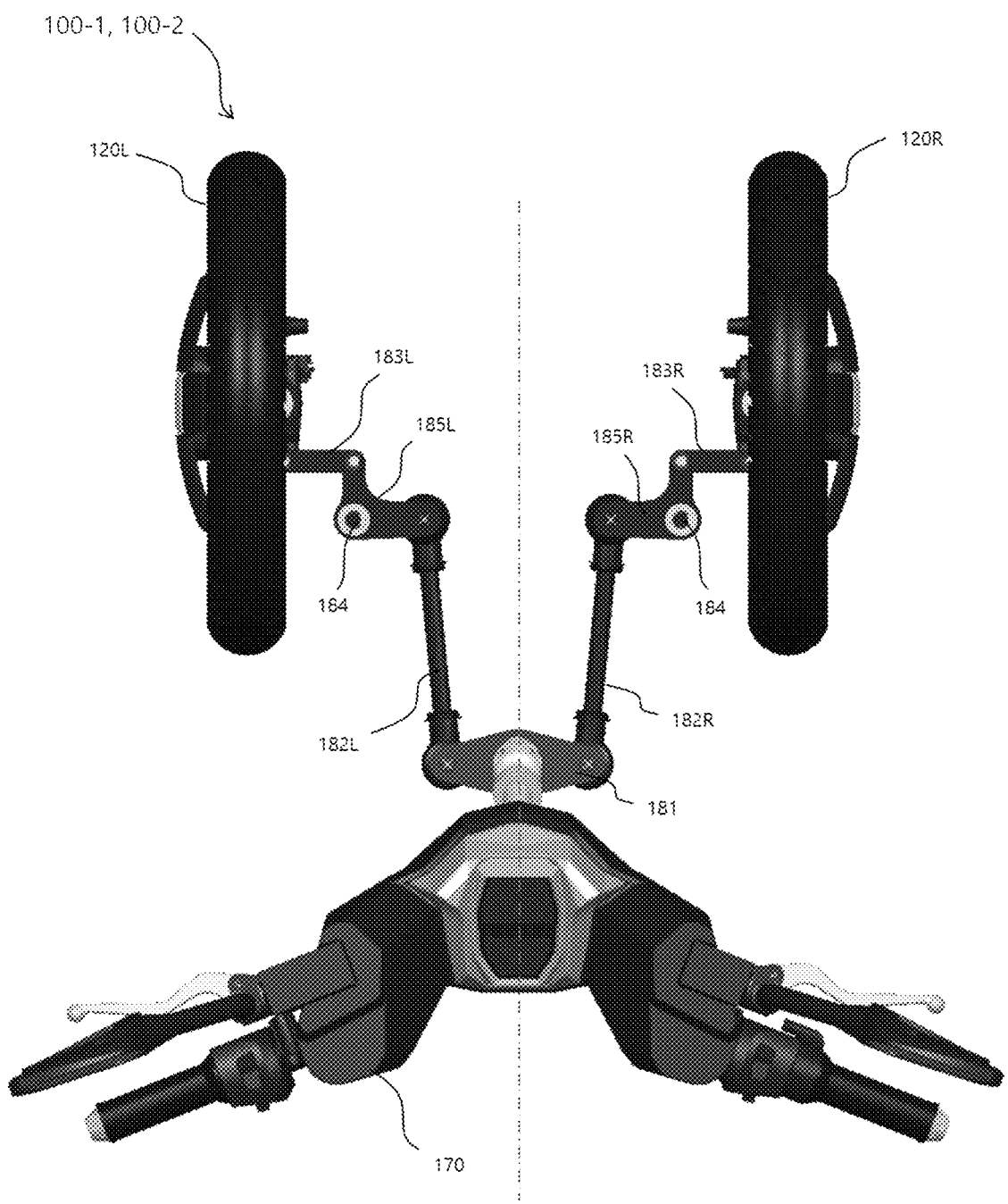
FIG. 26 is an exemplary view illustrating a planar structure in the straight driving form in which the steering handle part, the steering device, and the front steering wheel-left and the front steering wheel-right of the front chassis system of a tilting vehicle according to the present invention are assembled.
Figure 27:
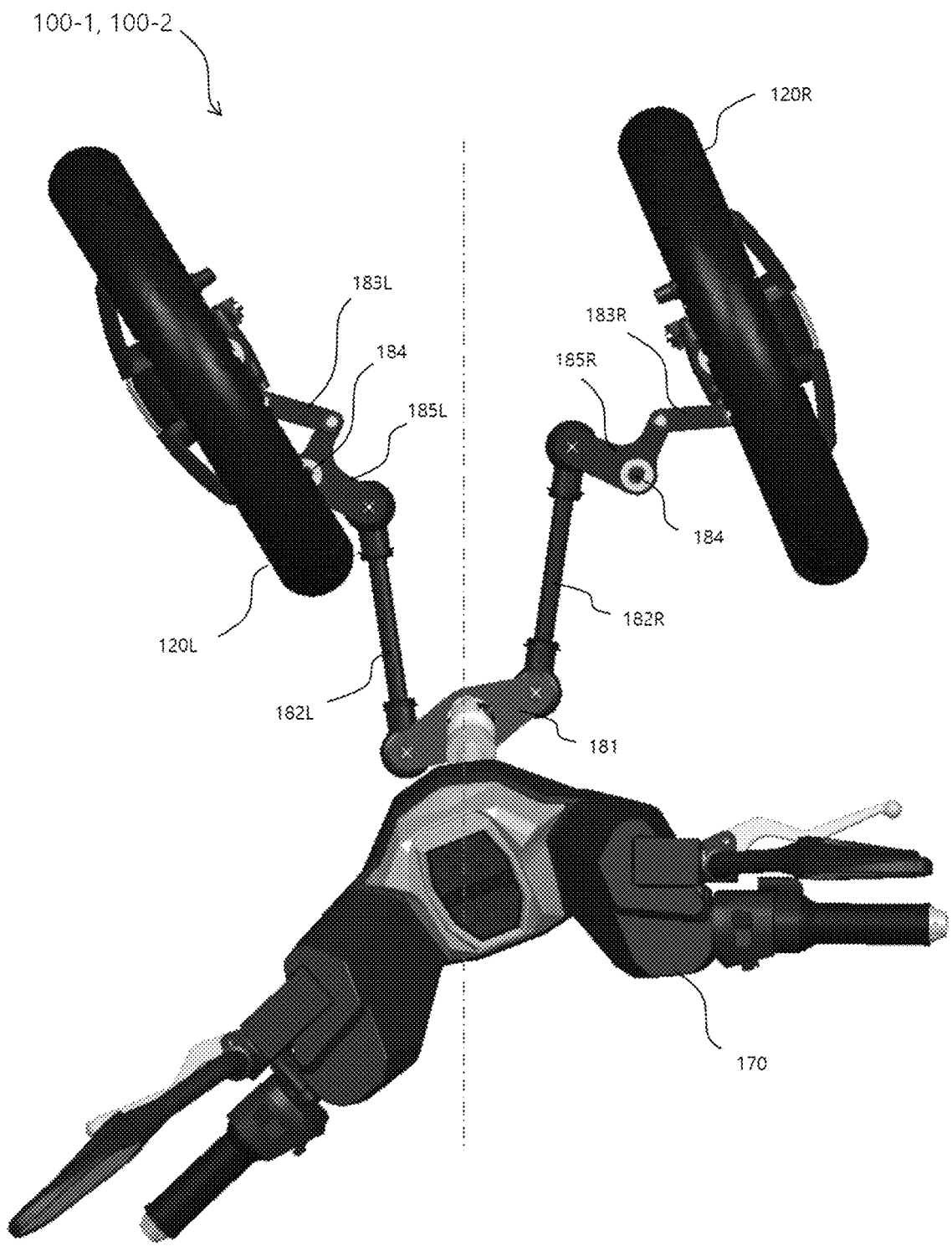
FIG. 27 is an exemplary view illustrating a planar structure in the form of left turning, in which the steering handle part, the steering device, and the front steering wheel-left and the front steering wheel-right of the front chassis system of a tilting vehicle according to the present invention are assembled.
Figure 28:
FIG. 28 is an exemplary view illustrating a three-dimensional exterior of the vehicle equipped with the front chassis system of a tilting vehicle according to the present invention.
Figure 29:
FIG. 29 is another exemplary view illustrating the three-dimensional exterior of the vehicle equipped with the front chassis system of a tilting vehicle according to the present invention.
Figure 30:
FIG. 30 is still another exemplary view illustrating the three-dimensional exterior of the vehicle equipped with the front chassis system of a tilting vehicle according to the present invention.

FIG. 1 is an exemplary schematic view illustrating a front chassis system of a tilting vehicle according to the present invention, FIG. 2 is another exemplary schematic view illustrating the front chassis system of a tilting vehicle according to the present invention, FIG. 3 is an exemplary schematic view illustrating a vehicle body of the front chassis system of a tilting vehicle according to the present invention, FIG. 4 is another exemplary schematic view illustrating the vehicle body of the front chassis system of a tilting vehicle according to the present invention, FIG. 5 is an exemplary view illustrating a front steering wheel-left and a front steering wheel-right of the front chassis system of a tilting vehicle according to the present invention, FIG. 6 is an exemplary view illustrating a structure of a front swing arm-left or front swing arm-right of the front chassis system of a tilting vehicle according to the present invention, FIG. 7 is an exemplary view illustrating a front shock absorber-left or front shock absorber-right of the front chassis system of a tilting vehicle according to the present invention, FIG. 8 is an exemplary schematic view illustrating a structure of a front shock absorber of the front chassis system of a tilting vehicle according to the present invention, FIG. 9 is an exemplary view illustrating a shape of a front tilt bar of the front chassis system of a tilting vehicle according to the present invention, FIG. 10 is an exemplary view illustrating a shape of a front tilt bar-left or front tilt bar-right of the front chassis system of a tilting vehicle according to the present invention, FIG. 11 is an exemplary view illustrating a shape of a front elastic roller of the front chassis system of a tilting vehicle according to the present invention, FIG. 12 is an exemplary view illustrating a structure of a steering handle part of the front chassis system of a tilting vehicle according to the present invention, FIG. 13 is an exemplary view illustrating a steering device of the front chassis system of a tilting vehicle according to the present invention, FIG. 14 is an exemplary view illustrating a front tilting rod-left or front tilting rod-right of the front chassis system of a tilting vehicle according to the present invention, FIG. 15 is an exemplary view illustrating a state in which the front elastic roller is assembled with the front tilt bar or the front tilt bar-left or the front tilt bar-right of the front chassis system of a tilting vehicle according to the present invention, FIG. 16 is an exemplary view illustrating a fastening method of the front shock absorber-left, the front shock absorber-right, the front shock absorber, the front tilting rod-left, or the front tilting rod-right of the front chassis system of a tilting device according to the present invention, FIG. 17 is an exemplary view illustrating a structure of a left steering rod or right steering rod of the front chassis system of a tilting vehicle according to the present invention, FIG. 18 is an exemplary view illustrating an exterior of a front side of a vehicle equipped with the front chassis system of a tilting vehicle according to the present invention, FIG. 19 is an exemplary view illustrating an exterior of the front side of the vehicle equipped with the front chassis system of a tilting vehicle according to the present invention in a state in which the vehicle is tilted, FIG. 20 is an exemplary view illustrating the exterior of the front side of the vehicle equipped with the front chassis system of a tilting vehicle according to the present invention, FIG. 21 is an exemplary view illustrating the exterior of the front side of the vehicle equipped with the front chassis system of a tilting vehicle according to the present invention in a state in which the vehicle is tilted, FIG. 22 is an exemplary view illustrating a shape of the front elastic roller according to rotation of the front tilt bar, the front tilt bar-left, or the front tilt bar-right of the front chassis system of a tilting vehicle according to the present invention, FIG. 23 is another exemplary schematic view illustrating the front chassis system of a tilting vehicle according to the present invention, FIG. 24 is an exemplary view illustrating a planar structure in a straight driving form in which the steering handle part, the steering device, and the front steering wheel-left and front steering wheel-right of the front chassis system of a tilting vehicle according to the present invention are assembled, FIG. 25 is an exemplary view illustrating a planar structure in the form of left turning, in which the steering handle part, the steering device, and the front steering wheel-left and the front steering wheel-right of the front chassis system of a tilting vehicle according to the present invention are assembled, FIG. 26 is an exemplary view illustrating a planar structure in the straight driving form in which the steering handle part, the steering device, and the front steering wheel-left and the front steering wheel-right of the front chassis system of a tilting vehicle according to the present invention are assembled, FIG. 27 is an exemplary view illustrating a planar structure in the form of left turning, in which the steering handle part, the steering device, and the front steering wheel-left and the front steering wheel-right of the front chassis system of a tilting vehicle according to the present invention are assembled, FIG. 28 is an exemplary view illustrating a three-dimensional exterior of the vehicle equipped with the front chassis system of a tilting vehicle according to the present invention, FIG. 29 is another exemplary view illustrating the three-dimensional exterior of the vehicle equipped with the front chassis system of a tilting vehicle according to the present invention, and FIG. 30 is still another exemplary view illustrating the three-dimensional exterior of the vehicle equipped with the front chassis system of a tilting vehicle according to the present invention. According to the present invention, in the front chassis system of a tilting vehicle, the vehicle body is tilted at a corner in a steering direction by a driver's steering operation involving tilting, and thus a leaning phenomenon of the vehicle body and a risk of overturning of the vehicle body are prevented. That is, the present invention is configured such that the vehicle may be tilted in a steering direction, that is, may perform lean driving, according to a steering operation of a driver at cornering and sharp turns of the vehicle, and thus stable turning in a curved section is ensured.

FIG. 1 is an exemplary schematic view illustrating a front chassis system of a tilting vehicle according to the present invention. A front chassis system 100-1 of a tilting vehicle according to the present invention includes a front swing arm-left 130L connecting a vehicle body 110-1 and a front steering wheel-left 120L, a front swing arm-right 130R connecting the vehicle body and a front steering wheel-right 120R, a front shock absorber-left 140L formed in the front swing arm-left, a front shock absorber-right 140R formed in the front swing arm-right, a front tilt bar 150 rotatably coupled to the vehicle body and having one side and the other side coupled to the front shock absorber-left and the front shock absorber-right, at least one front elastic roller 160 formed in the vehicle body to control a rotational operation of the front tilt bar, and a steering device 180 linked with a steering handle part 170 and connection-installed in the front steering wheel-left and the front steering wheel-right. The front elastic roller 160 is formed in surface contact with a lower portion of the front tilt bar 150 to limit rotation of the front tilt bar 150.

The front steering wheel-left 120L and the front steering wheel-right 120R are individually suspended, and thus the front shock absorber-left 140L and the front shock absorber-right 140R are each formed as an independent suspension device.

When the driver performs a steering operation involving tilting in a state in which the vehicle is turning in a curved section, the front steering wheel-left 120L and the front steering wheel-right 120R connection-installed in the front swing arm-left 130L and the front swing arm-right 130R are spaced apart from each other so that the vehicle body is inclined, the front tilt bar 150 connection-installed in the front shock absorber-left 140L and the front shock absorber-right 140R rotates about a front tilt bar pin 151 according to movement of the front swing arm-left and the front swing arm-right, the front tilt bar has resistance to a rotational force due to shape contact with the front elastic roller 160 (portions facing the roller are in contact with each other due to a shape of the roller), the vehicle receives elastic force resistance of the front elastic roller from the start of a tilting operation to a set range, the elastic force resistance is removed or reduced when the vehicle is out of the set range, and thus the vehicle is tilted in the steering operation direction.

When the vehicle leads to low-speed straight driving or is stopped in a state of being balanced in a left-right direction, the rotational force is generated due to shape contact with the front elastic roller 160 assembled in the front tilt bar 150, and the vehicle receives the elastic force resistance of the front elastic roller up to a set range before the tilting operation, and thus is suppressed from falling to left and right sides.

When the vehicle is parked in a state of being balanced in the left-right direction, the rotational force is generated due to shape contact with the front elastic roller 160 assembled in the front tilt bar 150, and the vehicle receives the elastic force resistance of the front elastic roller up to a set range before the tilting operation, is thus suppressed from falling to the left and right sides, and returns to a center even when the vehicle is tilted to left and right sides within a set range.

FIG. 2 is another exemplary schematic view illustrating a front chassis system of a tilting vehicle according to the present invention. A front chassis system 100-2 of a tilting vehicle according to the present invention includes a front swing arm-left 130L connection-installed in a vehicle body 110-2 and the front swing arm-left 130L, a front swing arm-right 130R connection-installed in the vehicle body and the front steering wheel-right 120R, a front tilting rod-left 190L connection-installed in the left front swing arm, a front tilting rod-righte 190R connection-installed in the front swing arm-right, a front tilt bar-left 150L connection-installed in the vehicle body and connection-installed in the front tilting rod-left, a front tilt bar-right 150R connection-installed in the vehicle body and connection-installed in the front tilting rod-right, a front shock absorber 140 connection-installed in the front tilt bar-left and the front tilt bar-right, at least one front elastic roller 160 installed in the vehicle body to control operation of the front tilt bar-left or the front tilt bar-right, and the steering device 180 installed to interlock with the steering handle part 170 assembled in the vehicle body and connection-installed in the front steering wheel-left and the front steering wheel-right. The front elastic roller 160 is formed in surface contact with a lower portion of the front tilt bar-left 150L or the front tilt bar-right 150R to limit operation of the front tilt bar-left 150L or the front tilt bar-right 150R.

The front steering wheel-left 120L and the front steering wheel-right 120R are individually suspended, and thus the front shock absorber 140 is formed as an independent suspension device.

When the driver performs a steering operation involving tilting in a state in which the vehicle is turning in a curved section, the front steering wheel-left 120L and the front steering wheel-right 120R connection-installed in the front swing arm-left 130L and the front swing arm-right 130R are spaced apart from each other so that the vehicle body is inclined, the front tilt bar-left 150L and the front tilt bar-right 150R connection-installed in the front tilting rod-left 190L and the front tilting rod-right 190R rotate about the front tilt bar pin 151 according to movement of the front swing arm-left and the front swing arm-right, the front tilt bar-left and the front tilt bar-right have resistance to a rotational force due to shape contact with the front elastic roller 160, the vehicle receives elastic force resistance of the front elastic roller from the start of a tilting operation to a set range, the elastic force resistance is removed or reduced when the vehicle is out of the set range, and thus the vehicle is tilted in the steering operation direction.

When the vehicle leads to low-speed straight driving or is stopped in a state of being balanced in a left-right direction, the rotational force is generated due to shape contact with the front elastic roller 160 assembled in the front tilt bar-left 150L and the front tilt bar-right 150R, and the vehicle receives the elastic force resistance of the front elastic roller up to a set range before the tilting operation, and thus is suppressed from falling to left and right sides.

When the vehicle is parked in a state of being balanced in the left-right direction, the rotational force is generated due to shape contact with the front elastic roller 160 assembled in the front tilt bar-left 150L and the front tilt bar-right 150R, and the vehicle receives the elastic force resistance of the front elastic roller up to a set range before the tilting operation, is thus suppressed from falling to the left and right sides, and returns to a center even when the vehicle is tilted to left and right sides within the set range.

FIG. 3 is an exemplary schematic view illustrating a vehicle body of the front chassis system of a tilting vehicle according to the present invention, and FIG. 4 is another exemplary schematic view illustrating the vehicle body of the front chassis system of a tilting vehicle according to the present invention. The vehicle body 110-1 or 110-2 according to the present invention includes a front swing arm pin assembly ⓐ, a vehicle body and steering handle part fastening unit ⓑ, a front tilt bar pin assembly part ⓒ, and a front elastic roller pin assembly part a.

FIG. 5 is an exemplary view illustrating a front steering wheel-left and a front steering wheel-right of the front chassis system of a tilting vehicle according to the present invention. The front steering wheel-left 120L and the front steering wheel-right 120R include driving or driven front wheels 121L and 121R, a front wheel hub, steering knuckles 122L and 122R, a front wheel brake device, and the like which are symmetrically configured.

Each of the steering knuckles includes a king pin assembly part ⓔ and a steering knuckle and steering link fastening unit ⓕ.

FIG. 6 is an exemplary view illustrating a structure of a front swing arm-left or front swing arm-right of the front chassis system of a tilting vehicle according to the present invention. The front swing arm-left 130L and the front swing arm-right 130R are installed in the front swing arm pin assembly part ⓐ using the front swing arm pin 131 in parallel to a rotation center of the front wheels 121L and 121R in the vehicle bodies 110-1 and 110-2, rotate about the front swing arm pin, and are installed in the king pin assembly part ⓔ using the respective steering knuckles 122L and 122R and a king pin 132. The front steering wheel-left 120L and the front steering wheel-right 120R rotate about the king pin, are formed so that the front shock absorber-left 140L and the front shock absorber-right 140R or the front tilting rod-left 190L and the front tilting rod-right 190R are connection-installed in the front swing arm and the front shock absorber or a front tilting rod fastening unit ⓖ, and are symmetrically provided to be formed by a front swing arm and steering restriction link pin fastening unit ⓗ.

FIG. 7 is an exemplary view illustrating a front shock absorber-left or front shock absorber-right of the front chassis system of a tilting vehicle according to the present invention. The front shock absorber-left 140L and front shock absorber-right 140R absorb vibrations or shocks from the front wheels 121L and 121R, are accompanied by tilting of the vehicle, and include a front swing arm and front shock absorber fastening unit ⓖ and a front tilt bar and shock absorber fastening unit ⓘ.

FIG. 8 is an exemplary schematic view illustrating a structure of a front shock absorber of the front chassis system of a tilting vehicle according to the present invention. The front shock absorber 140 absorbs vibrations or shocks from the front wheels 121L and 121R and includes a left and front tilt bar-right and front shock absorber fastening unit ⓙ.

FIG. 9 is an exemplary view illustrating a shape of a front tilt bar of the front chassis system of a tilting vehicle according to the present invention. The front tilt bar 150 is formed at two places including a vehicle body assembly part ⓒ and a shock absorber assembly part ⓙ, a shape connecting respective assembly parts is a v shape or a—shape, a lower end of the v shape or a middle of the—shape that is the vehicle assembly part is installed on a left-right central line of the vehicle body using the front tilt bar pin 151, the vehicle body assembly part ⓒ rotates about the front tilt bar pin, and the front shock absorber-left 140L or the front shock absorber-right 140R are connection-installed at both ends of the v shape or the—shape.

The front tilt bar is installed in contact with that a portion of the shape of the front elastic roller and is provided in a shape which is spaced apart from the shape of the front elastic roller and in which the amount of contact decreases after set rotation.

FIG. 10 is an exemplary view illustrating a shape of a front tilt bar-left or front tilt bar-right of the front chassis system of a tilting vehicle according to the present invention. Each of the front tilt bar-left 150L and the front tilt bar-right 150R includes the vehicle body assembly part ⓒ, the tilting rod assembly part ⓘ, and the shock absorber assembly part ⓙ, wherein the vehicle body assembly part is installed using the front tilt bar pin 151 to be parallel to the left-right center of the vehicle body and rotates about the front tilt bar pin, the tilting rod assembly part is formed such that the front tilting rod-left 190L or the front tilting rod-right 190R, and the shock absorber assembly part has a symmetrical shape such that the front shock absorber 140 is connection-installed therein.

The front tilt bar-left or the front tilt bar-right is installed in contact with a portion of the shape of the front elastic roller and is provided in a shape which is spaced apart from the front elastic roller and in which the amount of contact decreases after the set rotation.

FIG. 11 is an exemplary view illustrating a shape of a front elastic roller of the front chassis system of a tilting vehicle according to the present invention. The front elastic roller 160 includes an elastic material such as an elastomer or an elastic structure such as a spring, is provided in a roller shape or a roller shape having convex or concave irregularities, is spaced apart from the front tilt bar pin 151 in parallel to the front tilt bar pin 151, is installed in the front elastic roller pin assembly part ⓓ in the vehicle bodies 110-1 and 110-2 using a front elastic roller pin 161, and is fixed to or rotates about the front elastic roller pin.

Elastomers include natural rubbers, thermosetting elastomers, thermoplastic elastomers, and the like.

FIG. 12 is an exemplary view illustrating a structure of a steering handle part of the front chassis system of a tilting vehicle according to the present invention. The steering handle part 170 includes a steering handle part and steering center fastening unit ⓚ and the vehicle body and steering handle part fastening unit ⓑ to receive a steering force of the driver to transmit the steering force to a steering center 181 in order to transmit the steering force to the respective front wheels 121L and 121R.

FIG. 13 is an exemplary view illustrating a steering device of the front chassis system of a tilting vehicle according to the present invention. The steering device 180 according to the present invention includes the steering center 181 connection-installed in the steering handle part 170, a left steering rod 182L and a right steering rod 182R connection-installed in the steering center, a left steering link 183L and a right steering link 183R connection-installed in the steering knuckles 122L and 122R, a left steering restriction link 185L that rotates about a steering restriction link pin after being assembled with a steering rod and steering restriction link fastening unit ⓛ of the left steering rod and a steering link and steering restriction link fastening unit ⓜ of the left steering link and being assembled with the front swing arm and steering restriction link pin fastening unit ⓗ of the front swing arm-left 130L using a steering restriction link pin 184, and a right steering restriction link 185R that rotates about the steering restriction link pin after being assembled with the steering rod and steering restriction link fastening unit ⓛ of the right steering rod and the steering link and steering restriction link fastening unit ⓜ of the right steering link and being assembled with the front swing arm and steering restriction link pin fastening unit ⓗ of the front swing arm-right 130R using the steering restriction link pin 184. The steering center is formed at two places including the vehicle body assembly part ⓒ and the shock absorber assembly part ⓙ, a shape connecting respective assembly parts is the v shape or a ˆ shape or the —shape, the lower end of the v shape or an upper end of the ˆ shape or the middle of the —shape that is the vehicle assembly part is fixedly installed in the steering handle part, shapes of both ends of the v shape or the ˆshape or the —shape are symmetrically provided such that the left steering rod or the right steering rod is connection-installed therein, and a virtual line connecting two steering rod assembly parts is installed parallel to the center of the front swing arm pin 131.

When the vehicle is bounced or rebound in cornering driving or straight driving by tilting, the left steering rod and the right steering rod are connection-installed in the steering center such that the left steering rod and the right steering rod coincide with a center of the front swing arm pin 131, and thus the steering of the vehicle is maintained.

FIG. 14 is an exemplary view illustrating a front tilting rod-left or front tilting rod-right of the front chassis system of a tilting vehicle according to the present invention. The front tilting rod-left 190L and the front tilting rod-right 190R are accompanied by tilting of the vehicle, and include the front swing arm and front shock absorber fastening unit ⓖ and the front tilt bar and shock absorber fastening unit ⓙ

FIG. 15 is an exemplary view illustrating a state in which the front elastic roller is assembled with the front tilt bar or the front tilt bar-left or the front tilt bar-right of the front chassis system of a tilting vehicle according to the present invention. The front tilt bar 150 or the front tilt bar-left 150L or the front tilt bar-right 150R is assembled with the front tilt bar pin assembly part ⓒ and the front elastic roller pin assembly part ⓓ using the front tilt bar pin 151 and the front elastic roller pin 161 to be in contact with a partial shape of the front elastic roller 160.

FIG. 16 is an exemplary view illustrating a fastening method of the front shock absorber-left, the front shock absorber-right, the front shock absorber, the front tilting rod-left, or the front tilting rod-right of the front chassis system of a tilting device according to the present invention. The front shock absorber-left 140L or the front shock absorber-right 140R or the front shock absorber 140 or the front tilting rod-left 190L or the front tilting rod-right 190R are fastened to the front swing arm-left 130L or the front swing arm-right 130R or the front tilt bar 150 or the front tilt bar-left 150L or the front tilt bar-right 150R using a cushioning bushing, a ball joint, or a universal joint to accompany an occurrence of misalignment with fastening components, that is, torsion, according to the tilting of the vehicle or the bouncing or rebounding of the front wheels 121L and 121R.

In general, a relationship of cushion bushing<ball joint<universal joint is shown according to the size of the torsion.

FIG. 17 is an exemplary view illustrating a structure of a left steering rod or right steering rod of the front chassis system of a tilting vehicle according to the present invention. The left steering rod 182L and the right steering rod 182R are installed in the steering center 181 and the left steering restriction link 185L or the right steering restriction link 185R through a ball joint to accompany an occurrence of the misalignment, that is, the torsion, with the fastening components according to the tilting of the vehicle or the bouncing or rebounding of the front wheels 121L and 121R.

FIG. 18 is an exemplary view illustrating an exterior of a front side of a vehicle equipped with the front chassis system of a tilting vehicle according to the present invention. This corresponds to the front chassis system 100-1 of a tilting vehicle according to the present invention.

FIG. 19 is an exemplary view illustrating an exterior of the front side of the vehicle equipped with the front chassis system of a tilting vehicle according to the present invention in a state in which the vehicle is tilted. This corresponds to the front chassis system 100-1 of a tilting vehicle according to the present invention.

FIG. 20 is an exemplary view illustrating an exterior of a front side of a vehicle equipped with the front chassis system of a tilting vehicle according to the present invention. This corresponds to the front chassis system 100-2 of a tilting vehicle according to the present invention.

FIG. 21 is an exemplary view illustrating the exterior of the front side of the vehicle equipped with the front chassis system of a tilting vehicle according to the present invention in a state in which the vehicle is tilted. This corresponds to the front chassis system 100-2 of a tilting vehicle according to the present invention.

FIG. 22 is an exemplary view illustrating a shape of the front elastic roller according to rotation of the front tilt bar, the front tilt bar-left, or the front tilt bar-right of the front chassis system of a tilting vehicle according to the present invention. Rotation resistance (fitting resistance, pressing resistance, and compression resistance) is applied due to the shape and the elastic force of the front elastic roller 160 according to rotation of the front tilt bar 150 or the front tilt bar-left 150L or the front tilt bar-right 150R.

FIG. 23 is another exemplary schematic view illustrating the front chassis system of a tilting vehicle according to the present invention. The front chassis system 100-2 of a tilting vehicle according to the present invention is a double shock device because a shock absorption function is included in the front tilting rod-left 190L or the front tilting rod-right 190R.

FIG. 24 is an exemplary view illustrating a planar structure in a straight driving form in which the steering handle part, the steering device, and the front steering wheel-left and the front steering wheel-right of the front chassis system of a tilting vehicle according to the present invention are assembled. In the front chassis system 100-1 and 100-2 of a tilting vehicle according to the present invention, a left steering restriction link 184L and a right steering restriction link 184R are fastened to the left and right steering rods 182L and 182R and the left and right steering links 183L and 183R at one point at the same time, and thus the steering force of the steering handle part 170 by the driver is restricted to be transmitted to the front steering wheel-left 120L and front steering wheel-right and 120R in a correct direction.

FIG. 25 is an exemplary view illustrating a planar structure in the form of left turning, in which the steering handle part, the steering device, and the front steering wheel-left and the front steering wheel-right of the front chassis system of a tilting vehicle according to the present invention are assembled. In the front chassis system 100-1 and 100-2 of a tilting device according to the present invention, when the steering handle part 170 rotates counterclockwise by the driver, the steering center 181 rotates counterclockwise, and thus the left steering rod 182L is pulled and the right steering rod 182R is pushed. Further, due to the left steering restriction link 185L and the right steering restriction link 185R, the left steering link 183L pulls the front steering wheel-left 120L with respect to the king pin, and the right steering link 183R pushes the front steering wheel-right 120R, and thus the front chassis system 100-1 and 100-2 is steered to the left side.

FIG. 26 is an exemplary view illustrating a planar structure in the straight driving form in which the steering handle part, the steering device, and the front steering wheel-left and the front steering wheel-right of the front chassis system of a tilting vehicle according to the present invention are assembled. In the front chassis system 100-1 and 100-2 of a tilting vehicle according to the present invention, a left steering restriction link 184L and a right steering restriction link 184R are fastened to the left and right steering rods 182L and 182R and the left and right steering links 183L and 183R at respective points, and thus the steering force of the steering handle part 170 by the driver is restricted to be transmitted to the front steering wheel-left 120L and the front steering wheel-right 120R in a correct direction.

FIG. 27 is an exemplary view illustrating a planar structure in the form of left turning, in which the steering handle part, the steering device, and the front steering wheel-left and the front steering wheel-right of the front chassis system of a tilting vehicle according to the present invention are assembled. In the front chassis system 100-1 and 100-2 of a tilting device according to the present invention, when the steering handle part 170 rotates counterclockwise by the driver, the steering center 181 rotates counterclockwise, and thus the left steering rod 182L is pulled and the right steering rod 182R is pushed. Further, due to the left steering restriction link 185L and the right steering restriction link 185R, the left steering link 183L pulls the front steering wheel-left 120L with respect to the king pin, and the right steering link 183R pushes the front steering wheel-right 120R, and thus the front chassis system 100-1 and 100-2 is steered to the left side.

In the front chassis system of a tilting device as described above, the configurations and methods of the embodiments may not be limitedly applied, and the entirety or a portion of the respective embodiments may be selectively combined and configured so that various modifications may be made.

INDUSTRIAL APPLICABILITY

The front chassis system of a tilting vehicle according to the present invention is mounted on a vehicle and tilts a vehicle body by an inclination of the vehicle so that a two-wheeled vehicle can be steered at corners, the vehicle is balanced with respect to the center of gravity even when the vehicle is switched from high-speed straight driving or middle-speed straight driving to low-speed straight driving, driving stability and driving performance of the vehicle can be improved, and the vehicle can also be stopped or parked without a fixing device, and thus convenience of the driver can be improved.

Further, in the front chassis system of a tilting vehicle according to the present invention, the vehicle body is tilted in a steering direction by a steering operation involving tilting by the driver at corners, an occurrence of a leaning phenomenon of the vehicle or a risk of overturning of the vehicle body is prevented, and thus the front chassis system can be applied to all types of transportation apparatuses having three or more wheels. Thus, the front chassis system can be applied to not only electric vehicles using a driving force of a motor but also engine vehicles or bicycles by manpower.

The invention claimed is:

1. A front chassis system of a tilting vehicle, comprising:
a front swing arm-left connecting a vehicle body and a front steering wheel-left;
a front swing arm-right connecting the vehicle body and a front steering wheel-right;
a front shock absorber-left connected to the front swing arm-left;
a front shock absorber-right connected to the front swing arm-right;
a front tilt bar rotatably fixed to the vehicle body using a front tilt bar pin and having one side and the other side respectively coupled to the front shock absorber-left and the front shock absorber-right;
a front elastic roller formed in surface contact with a lower portion of the front tilt bar to limit a rotational operation of the front tilt bar; and
a steering device that is linked with a steering handle part assembled in the vehicle body and has one side and the other side respectively coupled to the front steering wheel-left and the front steering wheel-right,
wherein, when the vehicle leads to low speed straight driving or is stopped from driving in a state in which the vehicle is balanced in a left-right direction,
the front tilt bar has resistance to a rotational force due to shape contact with the front elastic roller, and
the vehicle receives elastic force resistance of the front elastic roller from start of a tilting operation up to a set range and is thus suppressed from falling to left and right sides.

2. The front chassis system of claim 1, wherein the front swing arm-left and the front swing arm-right are installed in the vehicle body using a front swing arm pin to be in parallel to a rotation center of the front steering wheel-left and a rotation center of the front steering wheel-right, rotate about the front swing arm pin, are installed in a respective steering knuckle using a king pin, and
the front steering wheel-left and the front steering wheel-right rotate about the king pin and have a symmetrical shape so that the front shock absorber-left and the front shock absorber-right or a front tilting rod-left and a front tilting rod-right are connection-installed therein.

3. The front chassis system of claim 1, wherein the front tilt bar is partitioned into a vehicle assembly part and a shock absorber assembly part,
a part connecting respective assembly parts has a "v" shape or a "-" shape,
a lower end of the "v" shape or a middle of the "-" shape that is the vehicle assembly part is installed on a left-right central line of the vehicle body using the front tilt bar pin,
the vehicle assembly part rotates about the front tilt bar pin, and
the front shock absorber-left or the front shock absorber-right are connection-installed at both ends of the "v" shape or the "-" shape.

4. The front chassis system of claim 1, wherein the front elastic roller is separated parallel to the front tilt bar pin, is installed in the vehicle body using a front elastic roller pin, and rotates about or is fixed to the front elastic roller pin, and
the front tilt bar or a front tilt bar-left or a front tilt bar-right is configured to contact with a portion of the front elastic roller, and is a configured to have a decreased amount of contact the rotational operation.

5. The front chassis system of claim 1, wherein the steering device includes:
the steering handle part connection-installed in a steering center
a left steering rod and a right steering rod connection-installed in the steering center;
a left steering link and a right steering link respectively connection-installed in a respective steering knuckle;
a left steering restriction link assembled in the left steering rod and the left steering link, assembled in the front swing arm-left using a steering restriction link pin, and configured to rotate about the steering restriction link pin; and
a right steering restriction link assembled in the right steering rod and the right steering link, assembled in the front swing arm-right using a steering restriction link pin, and configured to rotate about the steering restriction link pin,
wherein the steering center is partitioned into parts related to the handle and parts related to the steering rod,
a part connecting the respective assembly parts has a "v" shape or a "^" shape or a "-" shape,
a lower end of the v shape, an upper end of the "^" shape, a middle of the "-" shape that is the handle assembly part is fixedly installed in the steering handle part,
shapes of both ends of the "v" shape, the "^" shape, or the "-" shape are symmetrically provided such that the left steering rod or the right steering rod is connection-installed therein, and
a virtual line connecting two steering rod assembly parts is installed parallel to a center of a front swing arm pin.

6. The front chassis system of claim 5, wherein, when the vehicle is bounced or rebounced in cornering driving by tilting or straight driving, the left steering rod and the right steering rod are connection-installed in the steering center to coincide with the center of the front swing arm pin, and thus steering of the vehicle is maintained.

7. The front chassis system of claim 6, wherein the left steering rod and the right steering rod are installed in the steering center and the left steering restriction link or the right steering restriction link through a ball joint to accompany an occurrence of misalignment, that is, torsion, with the steering center, the left steering link and the right steering link according to the tilting of the vehicle or the bouncing or rebounding of the front steering wheel-left and the front steering wheel-right.

8. The front chassis system of claim 5, wherein the left steering restriction link and the right steering restriction link are fastened to the left and right steering rods and the left and right steering links at one point at the same time, and thus a steering force of the steering handle part by a driver is restricted to be transmitted to the front steering wheel-left and the front steering wheel-right.

9. The front chassis system of claim 1,
wherein, when a driver performs a steering operation involving tilting while a vehicle is turning in a curved section;
the front steering wheel-left and the front steering wheel-right connection-installed in the front swing arm-left and the front swing arm-right are spaced apart from each other so that the vehicle body is inclined;
the front tilt bar connection-installed in the front shock absorber-left and the front shock absorber-right rotates about the front tilt bar pin according to movement of the front swing arm-left and the front swing arm-right, or
a front tilt bar-left and a front tilt bar-right connection-installed in front tilting rod-left and a front tilting rod-right rotates about the front tilt bar pin according to the movement of the front swing arm-left and the front swing arm-right;

the front tilt bar or the front tilt bar-left or the front tilt bar-right has resistance to a rotational force due to shape contact with the front elastic roller; and the vehicle receives elastic force resistance of the front elastic roller from start of a tilting operation up to a set range, but when the vehicle is out of the set range, the elastic force resistance is removed or reduced, and thus the vehicle is tilted in a steering operation direction.

10. The front chassis system of claim 1,
wherein, when the vehicle is parked in a state in which the vehicle is balanced in a left-right direction;

the front tilt bar or a front tilt bar-left or a front tilt bar-right has resistance to a rotational force due to shape contact with the front elastic roller; and the vehicle receives the elastic force resistance of the front elastic roller from start of a tilting operation up to a set range, the vehicle is suppressed from falling to left and right sides, and the vehicle is restored to a center after the vehicle is tilted to left or right sides.

11. The front chassis system of claim 1, wherein the front steering wheel-left and the front steering wheel-right are individually suspended, and thus the front shock absorber and the front shock absorber-right are each formed as an independent suspension device.

12. A front chassis system of a tilting vehicle, comprising:
a front swing, arm-left connecting a vehicle body and a front steering wheel-left;
a front swing arm-right connecting the vehicle body and a front steering wheel-right;
a front tilting rod-left connected to the front swing arm-left;
a front tilting rod-right connected to the front swing arm-right;
a front tilt bar-left rotatably fixed to the vehicle body using a front tilt bar pin and connection-installed in the front tilting rod-left;
a front tilt bar-right rotatably fixed to the vehicle body using another front tilt bar pin and connected to the front tilting rod-right;
a front shock absorber having one side and the other side respectively coupled to the front tilt bar-left and the front tilt bar-right;
at least one front elastic roller formed in the vehicle body to limit a rotational operation of the front tilt bar-left-bar or the front tilt bar-right and formed in surface contact with a lower portion of the front tilt bar-left or the front tilt bar-right; and
a steering device that is linked with a steering handle part assembled in the vehicle body and has one side and the other side respectively coupled to the front steering wheel-left and the front steering wheel-right,
wherein, when the vehicle leads to low speed straight driving or is stopped from driving in a state in which the vehicle is balanced in a left-right direction,
the front tilt bar-left or the front tilt bar-right has resistance to a rotational force due to shape contact with the front elastic roller, and
the vehicle receives elastic force resistance of the front elastic roller from start of a tilting operation up to a set range and is thus suppressed from falling to left and right sides.

13. The front chassis system of claim 12, wherein the front tilt bar-left and the front tilt bar-right are each partitioned into a vehicle body assembly part, a tilting rod assembly part, and a shock absorber assembly part,
the vehicle body assembly parts are installed using the front tilt bar pin to be separated parallel to a left-right center of the vehicle body and rotates about the front tilt bar pin,
the tilting rod assembly part is formed such that the front tilting rod-left or the front tilting rod-right is installed therein, and
the shock absorber assembly part has a symmetrical shape so that the front shock absorber is connection-installed therein.

14. The front chassis system of claim 12, wherein the front chassis system is a double shock device because a shock absorption function is included in the front tilting left or the front tilting rod-right.

* * * * *